(12) United States Patent
Al Faruque et al.

(10) Patent No.: US 12,524,996 B2
(45) Date of Patent: Jan. 13, 2026

(54) CONTEXT-AWARE SELECTIVE SENSOR FUSION METHOD FOR MULTI-SENSORY COMPUTING SYSTEMS

(71) Applicant: THE REGENTS OF THE UNIVERSITY OF CALIFORNIA, Oakland, CA (US)

(72) Inventors: Mohammad Abdullah Al Faruque, Irvine, CA (US); Arnav Vaibhav Malawade, Irvine, CA (US); Trier Mortlock, Irvine, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 301 days.

(21) Appl. No.: 18/449,983

(22) Filed: Aug. 15, 2023

(65) Prior Publication Data

US 2024/0062519 A1    Feb. 22, 2024

Related U.S. Application Data

(60) Provisional application No. 63/371,459, filed on Aug. 15, 2022.

(51) Int. Cl.
| | |
|---|---|
| G06V 10/70 | (2022.01) |
| G06V 10/771 | (2022.01) |
| G06V 10/80 | (2022.01) |
| G06V 10/82 | (2022.01) |

(52) U.S. Cl.
CPC .......... *G06V 10/768* (2022.01); *G06V 10/771* (2022.01); *G06V 10/80* (2022.01); *G06V 10/82* (2022.01)

(58) Field of Classification Search
None
See application file for complete search history.

(56) References Cited

U.S. PATENT DOCUMENTS

| | | | |
|---|---|---|---|
| 2020/0082207 A1* | 3/2020 | Xie ...................... G01S 7/4802 |
| 2020/0184718 A1* | 6/2020 | Chiu ........................ G06T 7/20 |
| 2021/0097783 A1* | 4/2021 | Soltani Bozchalooi ..................... G05D 1/0094 |

(Continued)

OTHER PUBLICATIONS

Saeedi et al., "Context-Aware Personal Navigation Using Embedded Sensor Fusion in Smartphones," Sensors (Basel). Mar. 25, 2014;14(4):5742-5767. doi: 10.3390/s140405742 (Year: 2014).*

(Continued)

*Primary Examiner* — Soo Shin
(74) *Attorney, Agent, or Firm* — NGUYEN TARBET IP LAW

(57) ABSTRACT

A method for identifying a current context and determining a sensor combination based on the current environment. The method may comprise accepting a plurality of sensor outputs and implementing a CNN to convert the sensor outputs into a plurality of features that can be used to identify the context through use of a gating algorithm that additionally determines which sensors have the most importance and which have little or no importance. The method may further comprise executing sensor fusion in a manner corresponding to the context. For example, the context determines whether early fusion or late fusion should be implemented and which sensor outputs should be included in the said fusion.

20 Claims, 17 Drawing Sheets
(11 of 17 Drawing Sheet(s) Filed in Color)

(56) References Cited

U.S. PATENT DOCUMENTS

2021/0406560 A1* 12/2021 Park .................. G01S 13/867
2024/0378875 A1* 11/2024 Sajjan ................ G06V 20/58

OTHER PUBLICATIONS

Rashid, Nafiul, Trier Mortlock, and Mohammad Abdullah Al Faruque. "Self-care: Selective fusion with context-aware low-power edge computing for stress detection." 2022 18th International Conference on Distributed Computing in Sensor Systems (DCOSS). IEEE, 2022.

Malawade, Arnav Vaibhav, Trier Mortlock, and Mohammad Abdullah Al Faruque. "EcoFusion: Energy-aware adaptive sensor fusion for efficient autonomous vehicle perception." Proceedings of the 59th ACM/IEEE Design Automation Conference. 2022.

Malawade, Arnav Vaibhav, Trier Mortlock, and Mohammad Abdullah Al Faruque. "HydraFusion: Context-aware selective sensor fusion for robust and efficient autonomous vehicle perception." 2022 ACM/IEEE 13th International Conference on Cyber-Physical Systems (ICCPS). IEEE, 2022.

Chen et al. "Selectfusion: A generic framework to selectively learn multisensory fusion." arXiv preprint arXiv:1912.13077 (2019).

Lee et al. "Accuracy-power controllable lidar sensor system with 3D object recognition for autonomous vehicle." Sensors 20.19 (2020): 5706.

Gokhale, Vineet, Gerardo Moyers Barrera, and R. Venkatesha Prasad. "FEEL: Fast, energy-efficient localization for autonomous indoor vehicles." ICC 2021-IEEE International Conference on Communications. IEEE, 2021.

Snidaro, Lauro, Jesús García, and James Llinas. "Context-based information fusion: a survey and discussion." Information Fusion 25 (2015): 16-31.

Saeedi, Sara, Adel Moussa, and Naser El-Sheimy. "Context-aware personal navigation using embedded sensor fusion in smartphones." Sensors 14.4 (2014): 5742-5767.

Martí, Enrique David, et al. "Context-aided sensor fusion for enhanced urban navigation." Sensors 12.12 (2012): 16802-16837.

Gong, Yiping, et al. "Context-aware convolutional neural network for object detection in VHR remote sensing imagery." IEEE Transactions on Geoscience and Remote Sensing 58.1 (2019): 34-44.

Feng, Di, et al. "A review and comparative study on probabilistic object detection in autonomous driving." IEEE Transactions on Intelligent Transportation Systems 23.8 (2021): 9961-9980.

Arnold, Eduardo, et al. "A survey on 3d object detection methods for autonomous driving applications." IEEE Transactions on Intelligent Transportation Systems 20.10 (2019): 3782-3795.

Ahmed, Karim, Mohammad Haris Baig, and Lorenzo Torresani. "Network of experts for large-scale image categorization." Computer Vision—ECCV 2016: 14th European Conference, Amsterdam, The Netherlands, Oct. 11-14, 2016, Proceedings, Part VII 14. Springer International Publishing, 2016.

Aljundi, Rahaf, Punarjay Chakravarty, and Tinne Tuytelaars. "Expert gate: Lifelong learning with a network of experts." Proceedings of the IEEE conference on computer vision and pattern recognition. 2017.

Mullapudi et al. "Hydranets: Specialized dynamic architectures for efficient inference." Proceedings of the IEEE Conference on Computer Vision and Pattern Recognition. 2018.

* cited by examiner

| Fusion Type | Configuration | mAP (%) | Energy (J) | Latency (ms) |
|---|---|---|---|---|
| None | L. Camera ($C_L$) | 74.48% | 0.945 | 21.57 |
| | R. Camera ($C_R$) | 79.00% | 0.945 | 21.57 |
| | Radar ($R$) | 67.74% | 0.954 | 21.85 |
| | Lidar ($L$) | 70.45% | 0.954 | 21.85 |
| Early | $C_L + C_R + L$ | 80.26% | 1.379 | 31.36 |
| Late | $C_L + C_R + L + R$ | 77.98% | 3.798 | 84.32 |
| EcoFusion (Ours) | $\lambda_E = 0$ | 82.92% | 3.566 | 81.49 |
| | $\lambda_E = 0.01$ | 84.32% | 1.533 | 35.14 |
| | $\lambda_E = 0.05$ | 82.16% | 1.110 | 25.43 |

FIG. 9A

| Fusion Method | Model | mAP % |
|---|---|---|
| (i) No Fusion | Single Camera | 65.33 |
| | Radar | 69.42 |
| | Lidar | 61.86 |
| (ii) Early Fusion | L/R Cameras | 65.33 |
| | Radar + Lidar | 71.63 |
| | Camera + Lidar | 65.99 |
| (iii) Late Fusion | L/R Cameras | 65.71 |
| | Radar + Lidar | 65.33 |
| | L/R Cameras + Lidar | 66.20 |
| | Radar + Lidar + L/R Cameras | 71.16 |
| | All-Branches (Early + Late) | 65.47 |
| (iv) HYDRAFUSION (Ours) | Top-3 Branches w/ WBF | 74.54 |
| | Top-3 Branches w/ NMS | 78.51 |
| | Top-3 Branches w/ Soft-NMS | 81.31 |

FIG. 9B

| Fusion Method | Configuration | Energy (J) | Latency (ms) | Memory (MB) |
|---|---|---|---|---|
| None | Radar or Lidar | 0.954 | 21.85 | 769 |
| | Single Cam. | 0.945 | 21.57 | 767 |
| Early Fusion | L/R Cam. | 1.192 | 27.36 | 768 |
| | L/R Cam. + Lidar | 1.379 | 31.36 | 694 |
| | L/R Cam. + Lidar + Radar | 1.615 | 36.86 | 750 |
| Late Fusion | L/R Cam. | 1.959 | 43.99 | 923 |
| | L/R Cam. + Lidar | 2.878 | 64.09 | 1087 |
| | L/R Cam. + Lidar + Radar | 3.769 | 84.32 | 1239 |
| HYDRA-FUSION | 3-Branch (Deep Gating) | 3.317 | 73.84 | 1271 |
| | 3-Branch (Attn. Gating) | 3.284 | 73.02 | 1080 |
| | 5-Branch (Deep Gating) | 5.008 | 110.58 | 1390 |
| | 5-Branch (Attn. Gating) | 4.897 | 107.28 | 1390 |

FIG. 9C

| $\lambda_E$ | Gating Method | mAP (%) | Avg. Loss | Energy (J) |
|---|---|---|---|---|
| 0 | Knowledge | 82.43% | 1.519 | 2.021 |
| 0 | Deep | 82.68% | 0.915 | 3.556 |
| 0 | Attention | 82.92% | 0.915 | 3.566 |
| 0 | Loss-Based | 82.50% | 0.808 | 1.719 |
| 0.01 | Knowledge | 82.43% | 1.519 | 2.021 |
| 0.01 | Deep | 83.72% | 1.124 | 1.457 |
| 0.01 | Attention | 84.32% | 1.089 | 1.533 |
| 0.01 | Loss-Based | 81.65% | 0.809 | 1.280 |
| 0.1 | Knowledge | 82.43% | 1.519 | 2.021 |
| 0.1 | Deep | 81.98% | 1.432 | 1.008 |
| 0.1 | Attention | 79.72% | 1.280 | 0.960 |
| 0.1 | Loss-Based | 79.70% | 0.818 | 1.044 |

FIG. 10

| Modality Used | DT Mac. F1 | DT Acc. | RF Mac. F1 | RF Acc. | AB Mac. F1 | AB Acc. | LDA Mac. F1 | LDA Acc. | KNN Mac. F1 | KNN Acc. |
|---|---|---|---|---|---|---|---|---|---|---|
| $B_1$={BVP, EDA, TEMP}(Wrist) | 56.23 | 62.32 | 62.73 | 76.62 | 63.78 | 75.78 | 52.62 | 61.79 | 58.3 | 69.04 |
| $B_2$={ACC, BVP, EDA}(Wrist) | 58.46 | 48.27 | 62.88 | 77.71 | 62.39 | 76.63 | 60.23 | 69.63 | 58.9 | 68.55 |
| $B_3$={BVP, EDA}(Wrist) | 55.14 | 59.02 | 61.02 | 73.96 | 60.67 | 72.54 | 56.55 | 69.8 | 65.73 | 55.44 |
| $B_4$={ACC, BVP}(Wrist) | 51.54 | 60.66 | 56.86 | 71.38 | 57.83 | 71.96 | 58.67 | 68.36 | 55.51 | 67.05 |
| $B_5$={ACC, EDA}(Wrist) | 47.98 | 54.5 | 52.97 | 70.15 | 56.47 | 71.31 | 57.71 | 68.6 | 58.75 | 64.87 |

FIG. 13A

| Modality Used | DT Mac. F1 | DT Acc. | RF Mac. F1 | RF Acc. | AB Mac. F1 | AB Acc. | LDA Mac. F1 | LDA Acc. | KNN Mac. F1 | KNN Acc. |
|---|---|---|---|---|---|---|---|---|---|---|
| $B_1$={BVP, EDA, TEMP}(Wrist) | 74.1 | 84.27 | 84.66 | 89.01 | 85.29 | 88.96 | 71.46 | 77.32 | 83.74 | 86.56 |
| $B_2$={ACC, BVP, EDA}(Wrist) | 69.44 | 77.06 | 85.08 | 88.76 | 85.44 | 88.45 | 85.66 | 87.92 | 80.25 | 83.62 |
| $B_3$={BVP, EDA}(Wrist) | 80.8 | 84.48 | 86.37 | 89.33 | 86.13 | 89.26 | 83.77 | 86.55 | 79.7 | 83.66 |
| $B_4$={ACC, BVP}(Wrist) | 74.97 | 79.94 | 76.43 | 82.45 | 79.77 | 84.21 | 82.37 | 85.07 | 76.49 | 80.13 |
| $B_5$={ACC, EDA}(Wrist) | 65.65 | 76.1 | 72.77 | 82.42 | 75.39 | 83.52 | 78.66 | 84.19 | 73.72 | 77.55 |

FIG. 13B

| Modality Used | 3-Class | | | 2-Class | | | Wrist Only | Wrist Computing |
|---|---|---|---|---|---|---|---|---|
| | Best Model | Macro F1 | Accuracy | Best Model | Macro F1 | Accuracy | | |
| Related Works | | | | | | | | |
| All (Wrist+Chest) [10] | AB | 68.85 | 79.57 | LDA | 90.74 | 92.28 | No | No |
| All (Wrist+Chest) W/O ACC [10] | AB | 71.10 | 79.86 | LDA | 90.93 | 92.51 | No | No |
| All Chest [10] | LDA | 72.49 | 76.50 | LDA | 91.07 | 92.83 | No | No |
| All Chest W/O ACC [10] | AB | 72.51 | 80.34 | LDA | 91.47 | 93.12 | No | No |
| All Wrist [10] | AB | 64.12 | 75.21 | RF | 84.11 | 87.12 | Yes | Yes |
| All Wrist W/O ACC [10] | RF | 66.33 | 76.17 | RF | 72.51 | 80.34 | Yes | Yes |
| All Wrist + Trans. Chest [11] | GAN-RF | 74.5 | 81.4 | GAN-RF | 89.7 | 92.1 | No | No |
| All Wrist [12] | DNN | - | 83.43 | DNN | - | 93.14 | Yes | No |
| BVP (Wrist) [13] | HCNN | 64.15 | 75.21 | HCNN | 86.18 | 88.56 | Yes | No |
| Selected Branch Classifiers [Ours] | | | | | | | | |
| $B_1$={BVP, EDA, TEMP}(Wrist) | RF | 62.73 | 76.62 | RF | 84.66 | 89.01 | Yes | Yes |
| $B_2$={ACC, BVP, EDA}(Wrist) | RF | 62.88 | 77.71 | RF | 85.08 | 88.76 | Yes | Yes |
| $B_3$={BVP, EDA}(Wrist) | RF | 61.02 | 73.96 | RF | 86.37 | 89.33 | Yes | Yes |
| Traditional Late Fusion [Ours] | | | | | | | | |
| Soft-voting ($B_1, B_2, B_3$) | RF | 63.75 | 78.79 | RF | 87.09 | 90.00 | Yes | Yes |
| Hard-voting ($B_1, B_2, B_3$) | RF | 64.02 | 78.70 | RF | 87.17 | 89.89 | Yes | Yes |
| SELF-CARE [Ours] | | | | | | | | |
| Kalman ($B_1, B_2, B_3$) | RF | 71.97 | 86.34 | RF | 92.93 | 94.12 | Yes | Yes |

FIG. 13C

CONTEXT-AWARE SELECTIVE SENSOR FUSION METHOD FOR MULTI-SENSORY COMPUTING SYSTEMS

CROSS-REFERENCES TO RELATED APPLICATIONS

This application is a non-provisional and claims benefit of U.S. Provisional Application No. 63/371,459 filed Aug. 15, 2022, the specification of which is incorporated herein in its entirety by reference.

FIELD OF THE INVENTION

The present invention is directed to Multi-Sensory Computing Systems. The present invention is modular and can be applied to any application that uses sensor fusion.

BACKGROUND OF THE INVENTION

Autonomous vehicles (AVs) are multi-sensory computing systems that operate in complex, dynamic environments with many different actors. An AV must be able to perceive the environment accurately and efficiently to ensure safety across driving settings. Most modern AVs are equipped with multiple sensors and use sensor fusion techniques to help handle the uncertainties present in challenging driving scenes. Even with these methods, autonomous driving is a highly complex task, and large deep-learning algorithms are necessary to enable accurate perception.

Despite recent advances, industry-standard AV perception systems still tend to fail in difficult contexts. A naïve solution to the problem is to continue increasing the size and complexity of AV algorithms and incorporate more sensors to cover as many driving contexts as possible. However, AVs are energy-constrained multi-sensory computing systems, so the use of larger algorithms comes at the cost of reduced driving range, increased expense, and increased power and thermal demands on the vehicle. Moreover, in some contexts fusing more sensors can result in a less precise result. Thus, robust and accurate AV perception requires algorithms that can adapt to dynamically changing driving contexts as they appear without increasing the computation requirements.

Typical AV perception systems implement deep convolutional neural networks (CNNs), in which sensor measurements are fed through a series of convolutional layers to produce spatial features. These features are then used to detect objects in different regions of the visual scene. Sensor performance can vary depending on factors such as weather, lighting, and physical obstructions. Sensor fusion algorithms attempt to combine the benefits from each sensor to produce a more accurate result. However, in dynamic environments, the context of the scene is often overlooked or excluded from the fusion method entirely. Most modern multi-sensor approaches typically perform sensor fusion at only one point in the model, whether it be early fusion across the raw sensor measurements or late fusion after detections have been made. Furthermore, most works use static algorithms for fusion that do not depend on the context of the AV's operating environment. Context-aware sensing approaches have proven beneficial for a wide range of multi-sensory computing system applications. Humans intuitively leverage contextual information about the driving scene (e.g., weather, lighting, road type, high-level visual features) to adjust their decisions and focus while driving. Similarly, contextual information can inform AV perception and enable a more robust fusion in complex driving contexts.

In traditional sensor fusion approaches that have known dynamics, noise, and measurement models, more sensors can help achieve better results. Fusion across multiple homogeneous sensors can help reduce uncertainties by increasing confidence or providing measurements over a wider observation area to increase coverage. Fusing heterogeneous sensors can also reduce sensing uncertainties by providing information across a different feature set for the same task. However, the fusion of all sensors does not always guarantee better estimates, especially with highly nonlinear and dynamic systems such as AV perception systems. Hence, there are potential benefits to selectively fusing information obtained from sensors, as shown in some recent works. In "Selective sensor fusion for neural visual-inertial odometry" by Changhao Chen, et al., a selective sensor fusion scheme is developed for a visual-inertial odometry system to provide robustness against data corruption. The authors implement feature selection using data-driven models that consider measurement reliability and vehicle-environment dynamics. This work is extended to a generic framework for selective sensor fusion in deep pose estimation in "SelectFusion: a generic framework to selectively learn multisensory fusion," by Changhao Chen, et al. However, these works only implement late-fusion over the outputs of sensor-specific deep learning models, limiting their performance and efficiency. Authors in "Accuracy-power controllable lidar sensor system with 3D object recognition for autonomous vehicle" by Sanghoon Lee, et al. propose a strategy to alter the power levels and operating state of an AV lidar sensor depending on the vehicle's speed and environment. Similarly, "FEEL: fast, energy-efficient localization for autonomous indoor vehicles" by Vineet Gokhale, et al. proposes adjusting the sensing frequency for indoor robot localization according to environmental dynamics. These approaches primarily focus on improving sensor efficiency. In contrast to these related works, there exists a present need for selective fusion for AVs with a dynamic gating component. By selecting between multiple modalities and fusion locations, an invention implementing this could maximize robustness by selecting both how and when fusion takes place in the model.

In a similar vein, several works have studied the use of contextual information from the environment within an information fusion framework. Authors in "Context-based information fusion: a survey and discussion" by Lauro Snidaro, et al. survey context-based information fusion and discuss how different types of contextual information interact with state variables and traditional fusion approaches. Both "Context-aware personal navigation using embedded sensor fusion in smartphones" by Sara Saeedi, et al. and "Context-aided sensor fusion for enhanced urban navigation" by Enrique David Marti, et al. show that context-aided sensor fusion frameworks for navigation improve robustness over standard methods. Distinct from these works, there exists a present need for a system that utilizes deep learning models to learn contextual representations of scenes instead of static fusion rules to provide more robust results. Authors in "Context-aware convolutional neural network for object detection in VHR remote sensing imagery" by Yiping Gon, et al. extract contextual information using specialized feature mining within a CNN for object detection in very-high-resolution imagery. However, their approach is focused on obtaining contextual information from regions of interest in images, whereas the present approach extracts the context of a scene using multiple heterogeneous sensory inputs.

Traditional object detection methods use CNNs to extract spatial features from inputs to identify objects in the scene.

Object detection in AVs is more challenging as the physical aspects of the environment affect performance. Both "A Review and Comparative Study on Probabilistic Object Detection in Autonomous Driving" by Di Feng, et al. and "A survey on 3D object detection methods for autonomous driving applications" by Eduardo Arnold, et al. survey object detection in AVs; the former focuses on probabilistic methods, while the latter studies 3D detection methods. Both papers identify gaps in modeling sensor uncertainty. Sensor fusion methods can help offset some measurement inaccuracies.

Fusion methods in object detection largely fall into two main categories: feature-level (or early) fusion and decision-level (or late) fusion. Early fusion approaches can extract many multi-modal features from the input but can be sensitive to noise and outliers from the sensors, reducing their robustness. Late fusion methods are more robust to sensor noise but cannot combine intermediate features across sensors, limiting their performance. Thus, there exists a present need for a system for combining early and late fusion approaches. This would be the first work to propose a multi-layered fusion approach for object detection in AV perception systems.

It is difficult for prior systems to maintain computational efficiency when evaluating multiple object detection pipelines simultaneously due to the number of detection pipelines, or branches, that are run. Several types of multi-branch deep learning approaches have been proposed for image processing tasks. In "Network of experts for large-scale image categorization" by Karim Ahmed, et al., a network of experts approach to image categorization is proposed. Each branch is a CNN that only discriminates between the subset of classes it is assigned to learn, as this approach lacks an intelligent gating module. Similarly, "Expert gate: Lifelong learning with a network of experts" by Rahal Aljundi, et al. uses specific expert branches but focuses on life-long learning and the generation of new tasks and experts.

"Hydranets: Specialized dynamic architectures for efficient inference" by Ravi Teja Mullapudi, et al. explores efficient methods for single image classification, where the authors use branches developed to compute features on visually similar classes. During training, the authors employ an adaptive form of dropout where entire branches are dropped when they are not chosen by the gating function. Similarly, TridentNet is a network that addresses the problem of scale variation in object detection. Its three-branch architecture shares parameters and structure between branches, resulting in faster training and inference and the enforcement of similar operations across feature maps, but this requires similarly structured branches. Thus, there exists a present need for a system that takes in multiple heterogeneous sensor modalities as inputs, incorporates context into an intelligent branch selection method, and targets dynamic sensor fusion for robust object detection via a multi-branch approach. Additionally, there exists a present need for a system that enables the specialization of branches to individual sensors or subsets of sensors to improve robustness across varying driving contexts.

Overall, there exists a present need for a system for (i) implementing a fusion approach that is robust across diverse contexts, noise sources, and sensor error types; (ii) using the context of a scene to improve sensor fusion performance; and (iii) implementing an efficient multi-sensor fusion approach for energy-constrained AV edge devices.

BRIEF SUMMARY OF THE INVENTION

It is an objective of the present invention to provide systems and methods that allow for optimal determination of sensor fusions for energy efficiency and accuracy, as specified in the independent claims. Embodiments of the invention are given in the dependent claims. Embodiments of the present invention can be freely combined if they are not mutually exclusive.

The present invention is directed to a context-aware sensor fusion approach that actively identifies the driving context and uses it to selectively fuse sensor data from different modalities at varying depths in the model. By using a selective sensor fusion approach, the present invention can improve the robustness of AV perception without increasing the computational demands on the energy-constrained AV edge platform. To the knowledge of the inventors, this is the first context-aware selective sensor fusion approach that can dynamically adjust both how and when fusion is applied. The present invention relates mainly to object detection in the AV perception system, however, it is posited that the proposed approach can be applied to a variety of cyber-physical sensor fusion applications, including tracking, localization, and mapping.

The present invention features a novel multi-branch sensor fusion architecture that enables early fusion, late fusion, as well as intermediate combinations. The present invention additionally features intelligent, context-aware gating strategies that maximize robustness by dynamically selecting the fusion methodology depending on the current context. The present invention outperforms existing methods on a challenging real-world dataset containing a wide range of driving contexts, including bad weather, poor lighting, and various location types. The present invention can be implemented on an industry-standard AV hardware platform, the Nvidia® Drive PX2, to demonstrate that this approach can be practically deployed in a real AV with comparable energy consumption, latency, and memory usage to state-of-the-art methods. The algorithmic implementation may be open-sourced to benefit the research community and enable further study of selective sensor fusion approaches for multi-sensory computing system problems.

One of the unique and inventive technical features of the present invention is the use of gating processes to determine which sensors to implement in sensor fusion. Without wishing to limit the invention to any theory or mechanism, it is believed that the technical feature of the present invention advantageously provides for energy-efficient detection of objects and conditions without losing any accuracy or robustness. None of the presently known prior references or work has the unique inventive technical feature of the present invention.

Any feature or combination of features described herein are included within the scope of the present invention provided that the features included in any such combination are not mutually inconsistent as will be apparent from the context, this specification, and the knowledge of one of ordinary skills in the art. Additional advantages and aspects of the present invention are apparent in the following detailed description and claims.

BRIEF DESCRIPTION OF THE SEVERAL VIEWS OF THE DRAWING(S)

The patent or application file contains at least one drawing executed in color. Copies of this patent or patent application publication with color drawing(s) will be provided by the Office upon request and payment of the necessary fee.

The features and advantages of the present invention will become apparent from a consideration of the following detailed description presented in connection with the accompanying drawings in which:

FIG. 1A shows qualitative analysis of object detection with different sensors and their fusion across three contexts. Ground truth detections are shown with a dotted border, while sensor-specific and fusion detections are shown in their respective shades and solid lines. The present invention achieves the most accurate predictions across contexts.

FIG. 9A shows a table of energy consumption and performance evaluation during the experimentation of the present invention.

FIG. 9B shows a table of object detection mAP scores on the dataset for (i) single sensors, (ii) early fusion, (iii) late fusion, and (iv) the present invention with Attention Gating.

FIG. 9C shows a table of hardware evaluations on the Nvidia® Drive PX2. Reported numbers are for processing one input through the model.

FIG. 10 shows a table evaluating a plurality of gating methods.

Figure 11:
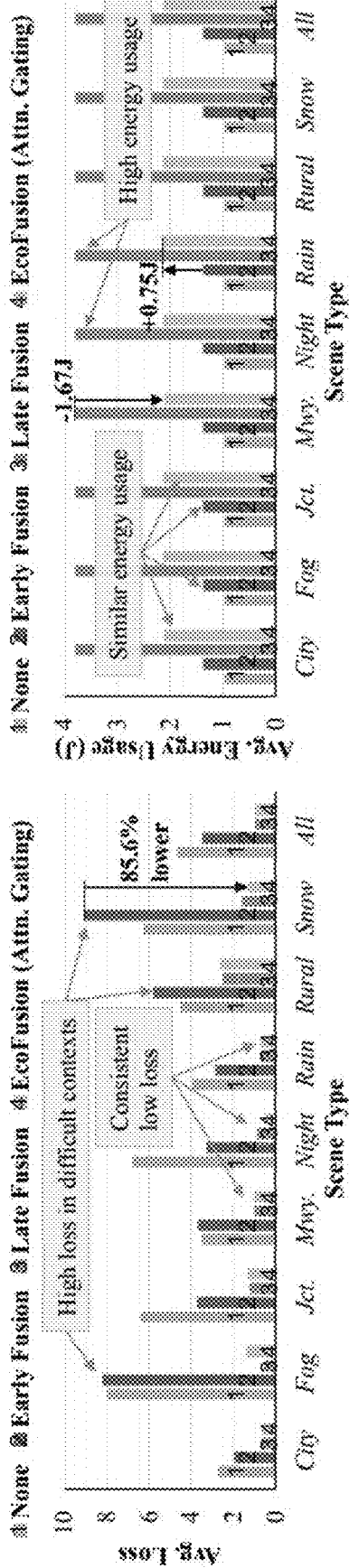

FIG. 11 shows a graph of average loss and energy consumption per scenario for each fusion method. Junction and Motorway are abbreviated as Jct. and Mwy., respectively. The present invention achieves low loss across scenes with 43.7% lower energy consumption than late fusion.

Figure 12:
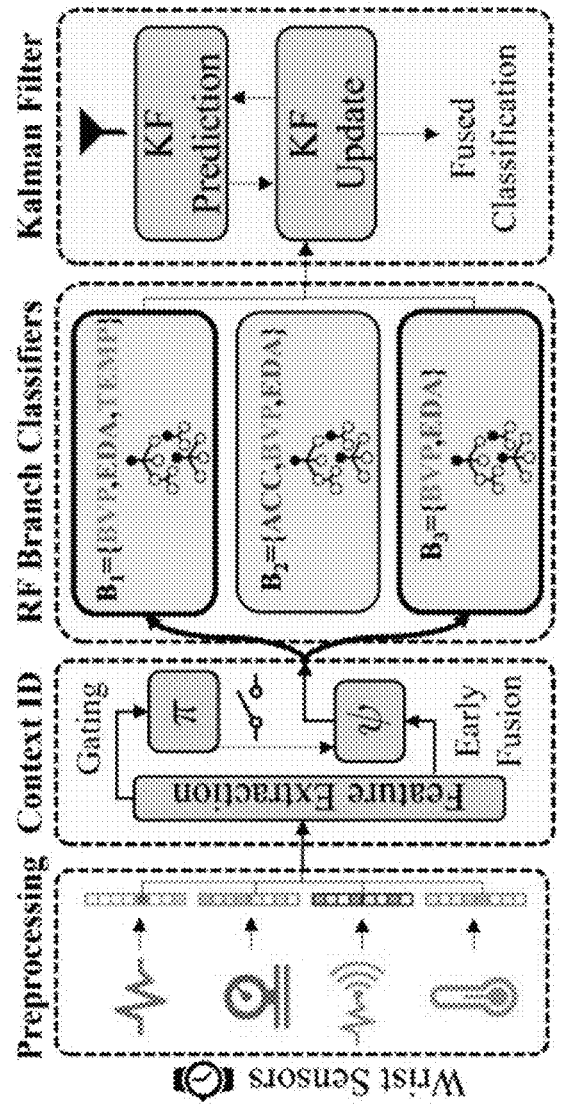

FIG. 12 shows a proposed architecture of an embodiment of the present invention for self-care. In this depiction, four types of wrist-worn sensors are used, the gating model selects two branches given the context, a Random Forest classifier is used for the branch models, and a Kalman filter is used for the late fusion over the two selected branches.

FIG. 13A shows a table of early fusion performance of wrist modalities in the dataset for 3 classes (baseline vs. stress vs. amusement).

FIG. 13B shows a table of early fusion performance of wrist modalities in the dataset for 2 classes (stress vs. non-stress).

FIG. 13C shows a table of overall performance comparison of related works using LOSO validation.

Figure 14:
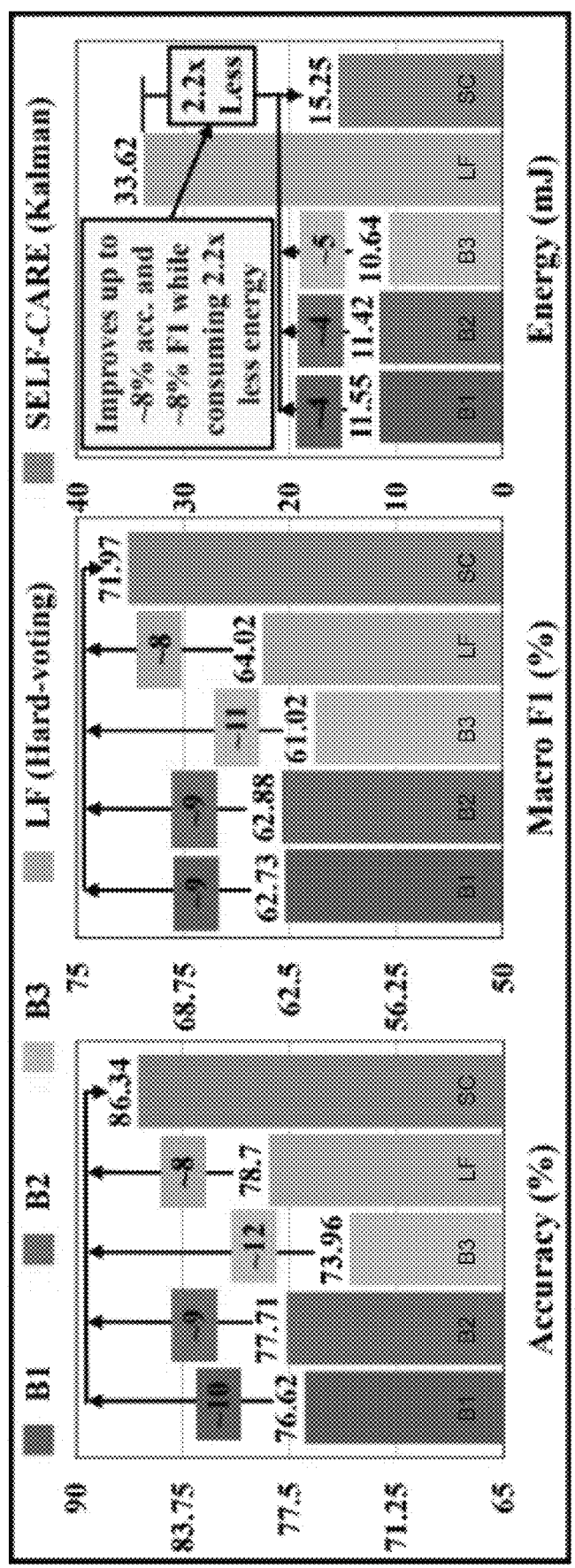

FIG. 14 shows a table of benchmarking on 3-class classification.

DETAILED DESCRIPTION OF THE INVENTION

Following is a list of elements corresponding to a particular element referred to herein:
100 sensors
200 processor
300 memory component The term "convolutional neural network" is defined herein as a kind of network architecture for deep learning algorithms and is specifically used for image recognition and tasks that involve the processing of pixel data.

The term "feature" is defined herein as a piece of information about the content of an image; typically about whether a certain region of the image has certain properties.

The term "object detection model" is defined herein as a machine learning model configured to identify objects in a certain context based on sensor output.

The term "optimal fusion of sensors" is defined herein as a combination of sensor types that would provide the most useful sensor outputs in a certain context.

The term "optimal sensor fusion timing" is defined herein as a selection of early sensor fusion or late sensor fusion based on what would result in more efficient and accurate operation of the multi-sensor computer system. Early fusion is the combination of sensor output values into a single stream of data before further processing occurs, and late fusion is the combination of sensor output values into a single stream of data after processing occurs.

The term "context" is defined herein as a set of parameters describing the environment relative to the plurality of sensors, such as temperature, weather, location, etc.

The term "branch" is defined herein as a set of instructions and decisions that are configured to operate the multi-sensor computer system better in certain contexts than others. Thus, an optimally performing branch is any branch that would enhance the efficiency and accuracy of operation of the multi-sensor computing system.

The term "Gaussian weighting process" is defined herein as executing a distribution over functions by specifying a multivariate normal (Gaussian) distribution over all possible function values.

The term "gating CNN" is defined herein as a type of language model that combines convolutional networks with a gating mechanism.

The term "expected loss" is defined herein as a predicted mathematical value that quantifies the difference between predicted and actual values in a machine learning model.

It is to be noted that in the context of the multi-sensor computing system of the present invention, the "efficiency" of the system is how quickly the system is able to detect objects and act accordingly to the objects. For example, if the system is implemented on an autonomous car, how quickly other cars are able to be identified, and how quickly the system comes to a decision on how to operate the vehicle safely around the other cars.

In the context of the multi-sensor computing system of the present invention, the "accuracy" of the system is how comprehensively the system is able to detect objects and the system's ability to come to the best possible decision with respect to the surrounding objects. For example, if the system is implemented on an autonomous car, the success rate of identifying all surrounding objects as well as the success rate of the system's ability to operate the car to safely avoid the objects in the most efficient manner possible.

The present invention features a multi-sensor computer system for identifying a current context and determining an optimal combination of sensors for efficiently improving perception thereof. In some embodiments, the multi-sensor computer system may comprise a plurality of sensors (100) operatively coupled to the multi-sensor computer system such that an output of each sensor of the plurality of sensors (100) relates to a state of the multi-sensor computer system, a processor (200) capable of executing computer-readable instructions, and a memory component (300) operatively connected to the processor. The memory component (300) may comprise a plurality of convolutional neural networks (CNNs). Each CNN of the plurality of CNNs may be configured to accept a plurality of sensor outputs from the plurality of sensors (100) as input, and generates a set of features found in the output from the sensor as output. The memory component (300) may further comprise one or more gating models. Each gating model of the one or more gating models may be configured to accept a plurality of sets of features as input, identify the current context, estimate a performance of one or more branches in the current context, each branch comprising an object detection model and representing an optimal fusion of sensors and an optimal sensor fusion timing, and selecting one or more optimally-performing branches of the one or more branches.

The memory component (300) may further comprise a plurality of computer-readable instructions that, when executed by the processor, cause the processor to perform operations comprising accepting a plurality of sensor outputs from the plurality of sensors (100), executing the plurality of CNNs. Each CNN may correspond to a sensor output of the plurality of sensor outputs. The plurality of CNNs may accept the plurality of sensor outputs as input and generate the plurality of sets of features as output, executing one or more gating models to determine the one or more optimally-performing branches based on the plurality of sets of features, and generating, based on each object detection model of the one or more optimally-performing branches, one or more detections corresponding to the one or more optimally-performing branches, each detection comprising bounding box coordinates, confidence level, and classification. The operations may further comprise executing a fusion block comprising a plurality of fusion algorithms to generate a final fusion of the one or more detections corresponding to the one or more optimally-performing branches and determining, based on the final fusion, one or more objects relative to the multi-sensor computer system.

The present invention features a method for identifying a current context and determining an optimal combination of sensors for efficiently improving the perception of a multi-sensor computer system. In some embodiments, the method may comprise providing a plurality of sensors (100) operatively coupled to the multi-sensor computer system such that an output of each sensor of the plurality of sensors (100) relates to a state of the multi-sensor computer system, accepting a plurality of sensor outputs from the plurality of sensors (100), and executing a plurality of convolutional neural networks (CNNs). Each CNN may correspond to a sensor output of the plurality of sensor outputs. The plurality of CNNs may accept the plurality of sensor outputs as input and generates a plurality of sets of features as output. The method may further comprise executing one or more gating models.

Each gating model of the one or more gating models may be configured to accept the plurality of sets of features as input, identify the current context, estimate a performance of one or more branches in the current context, each branch comprising an object detection model and representing an optimal fusion of sensors and an optimal sensor fusion timing, and selecting one or more optimally-performing branches of the one or more branches, to determine the one or more optimally-performing branches. The method may further comprise generating, based on each object detection model of the one or more branches, one or more detections corresponding to the one or more optimally-performing branches, each detection comprising bounding box coordinates, confidence level, and classification, executing a fusion block comprising a plurality of fusion algorithms to generate a final fusion of the one or more detections corresponding to the one or more optimally-performing branches, and determining, based on the final fusion, one or more objects relative to the multi-sensor computer system.

In some embodiments, the plurality of sensors (100) may comprise a camera, a radar sensor, a lidar sensor, or a combination thereof. In some embodiments, the current context may be selected from a group comprising city, motorway, junction, rural, snow, fog, and night. In some embodiments, the one or more gating models may comprise a rigid knowledge-based gating model comprising steps for determining the current context based on the plurality of sets of features, enhanced by data from a navigation/weather system. In some embodiments, the one or more gating models may comprise a learned dynamic deep gating model comprising steps for implementing a gating CNN, a multi-layer perceptron (MLP), a recurrent neural network (RNN), or any other deep learning or statistical model to compare the plurality of sets of features to possible branches in order to determine the one or more optimally-performing branches. In some embodiments, the one or more gating models may comprise an attention-based dynamic gating model comprising steps for selecting one or more sets of features of the plurality of sets of features comprising a majority of relevant sensor outputs for determining the current context, and comparing the one or more selected sets of features to possible branches in order to determine the one or more optimally-performing branches.

In some embodiments, selecting the one or more optimally-performing branches may comprise executing a top-k algorithm. In some embodiments, the plurality of fusion algorithms may comprise non-maximum suppression for calculating an intersection over the union of corresponding bounding box estimations and determining which bounding box estimations to keep based on confidence levels. In some embodiments, the plurality of fusion algorithms may comprise soft non-maximum suppression (NMS) for lowering confidence levels by a Gaussian weighting function, and determining which bounding box estimations remain above a threshold value, weighted box fusion for clustering bounding box estimations and iterating over intersection over union values for each bounding box estimation to determine which bounding box estimations have a confidence score over a threshold value or a combination thereof. In some embodiments, the memory component may further comprise instructions for selecting, from the one or more optimally-performing branches, one or more energy-efficient branches that minimize energy consumption and expected loss based on comparison of expected energy consumption of the one or more branches to expected loss of the one or more branches. In some embodiments, the method may further comprise steps for selecting, from the one or more optimally-performing branches, one or more energy-efficient branches that minimize energy consumption and expected loss based on comparison of expected energy consumption of the one or more branches to expected loss of the one or more branches.

The present invention features a novel adaptive sensor fusion approach that jointly optimizes performance and energy consumption by identifying the context of an environment before subsequently adapting the model and fusion architecture. The model can: (i) adapt between using no fusion, early fusion, and late fusion, (ii) select from one or more sensor inputs, and (iii) execute different types of fusion simultaneously depending on what it determines is the best execution path to minimize loss and energy consumption in the current context jointly. The workflow for the approach is described below.

First, sensor measurements are passed through modality-specific stem models, which produce an initial set of features for each sensor. Next, the gate model uses these features and the set of all possible model configurations to estimate the loss of each possible configuration for the given inputs. After selecting the candidate configurations for optimization using a maximum loss threshold, these candidates are passed, their known energy consumption, and their estimated losses to the joint optimization function. The optimization function selects the configuration that best minimizes both energy consumption and expected loss. Then, this configuration is executed. Since the configuration represents an ensemble of one or more machine learning (ML) models, denoted as branches, each branch was run in the selected configuration with its expected inputs and collected the resulting outputs. These are then fused using the fusion model, producing a final set of outputs. The different components in the architecture are detailed below.

The stem models serve as preprocessors that produce an initial set of features for each sensor modality. The stems can be implemented using statistics-based feature extractors (e.g. finite impulse response (FIR) filters, Fourier transforms, mean/standard deviation), or machine learning models (e.g., classical ML models, CNNs, multi-layer perceptrons (MLPs), recurrent neural networks (RNNs)). The stems are modality-specific, so there is one stem for each type of sensor used. The features output by all the stems is passed to the gate model to identify the current context, run the joint optimization, and select the best configuration of branches to execute. Then, the stem features are passed as input to the selected branches.

This component identifies the context of the current input and uses it to select the best subset of branches to run as part of the joint optimization between performance and energy consumption.

The branches in the model take the form of various machine learning models. In prior works, both object detection and classification models can be used as branches to solve object detection and stress detection tasks, respectively. For example, a Faster R-CNN object detector containing a ResNet-18 CNN model and a Region Proposal Network (RPN) was evaluated previously. In the present invention, random forest classifiers were used as the branches. Other machine learning models can be used as well including classical ML models (e.g., support vector machines, bayesian models, decision trees), MLPs, CNNs, and temporal models such as RNNs. Each branch can be configured to process either a single sensor or a set of sensors. Using the gate to select the branches, the model can dynamically choose between no fusion, early fusion, late fusion, and various combinations of the three.

The fusion model is a component that can fuse outputs from several branches of the multi-branch model architecture to produce a more refined final result. The fusion block can be implemented via a typical late-fusion algorithm (e.g., weighted boxes fusion, soft non-maximal suppression) or a machine learning model (e.g., classical ML models, CNN, MLP, RNN). In this work, a fusion model was implemented for both object detection tasks (fusing overlapping boxes and filtering out low-confidence boxes) and classification tasks (fusing class predictions from the branches).

Using sensor data features to model the relationship between the current sensory context and the performance of each configuration of the multi-branch architecture.

Several gating strategies were implemented to estimate the fusion losses of each branch configuration and select the best branch configuration for each input. The goal of each gating model is to (i) identify the context based on the input features, (ii) estimate the performance of each branch configuration in the context, and (iii) compute the optimization result and use it to select the best configuration. Steps (i) and (ii) can be accomplished using a simple domain-knowledge-based or statistical solution. For example, the Knowledge Gating implementation of prior systems used current weather, lighting, and road type information as external context; this information was then used with domain knowledge to select the best branch configuration. Context identification and performance estimation can also be done using a machine learning model (e.g., classical ML models, CNN, MLP, RNN). In this case, the goal of the machine learning model is to model the expected performance of each branch configuration for a set of stem features. For example, this can be done using a CNN+MLP model and using a decision tree classifier. After the context is identified and the performance of each branch configuration is estimated, a joint optimization is used to select the best branch configuration.

A joint optimization between the performance and the energy efficiency of each model configuration, such that the trade-off between energy efficiency and performance can be dynamically adjusted.

The joint optimization is a joint minimization between energy consumption and model performance. This optimization takes as input (i) the estimated performance of each branch configuration, (ii) the expected energy consumption of each branch configuration, (iii) a threshold value, and (iv) an energy weight parameter. First, the configuration with the best-expected performance was identified. Then the set of all configurations that have a performance within the threshold of this best configuration was collected. The threshold can be defined based on the problem and represents the maximum deviation in performance from the best-performing configuration that is allowed to enable the exploration of more efficient configurations. The threshold can be implemented as a fixed value or a learnable parameter that is derived using a statistics or ML-based method. Then, a joint loss of each of the selected configurations was computed as a function (e.g. weighted-sum, machine learning model) between expected loss and energy consumption. In this computation, the energy weight scales the relative importance of energy efficiency with respect to the estimated performance in the joint loss computation.

The present invention is directed to object detection methods in AVs. It is assumed that the AV uses a variety of sensing modalities to take measurements of the driving scene. At discrete time steps, samples are generated, which consist of input measurements, X, from the sensors. The objective is to accurately detect objects, Y, within each scene using the sensor measurements:

$$Y = \phi(X), \quad (1)$$

$$Y = \{Y_{class}^i, Y_{reg}^i\}_{i=1 \ldots d} \quad (2)$$

where $\Phi$ represents the function for performing object detection, Y is composed of classification and regression components, and d represents the maximum number of objects to detect in a sample. $\phi$ can take the form of conventional fusion algorithms, a machine learning model, or an ensemble of machine learning models. Classification refers to the identification of each detected object's class. The classification target for each object can be defined as:

$$Y_{reg}^i \in \{1,2,3,\ldots,k\} \quad (3)$$

where k represents the number of classes considered in the problem. These indices can represent a predefined mapping to object classes (e.g., 1:car, 2:van, 3:truck, and so forth). Regression refers to the estimation of an object's location within the sample. These targets can be represented by:

$$Y_{reg}^i = [\mu_1, \nu_1, \mu_2, \nu_2] \in R^2 \quad (4)$$

where μ and ν denote the object's 2D bounding box coordinates in reference to a generic coordinate frame.

The measurements from s sensors can be fused by a variety of means to improve detection results. An early fusion approach involves fusing the raw sensor measurements before passing them to φ:

$$Y = \phi(\psi(X_1, X_2, \ldots, X_s)) \quad (5)$$

with ψ representing the function used to fuse the measurements. In the case of late fusion, $\hat{\psi}$ represents a function fusing the separate output detections:

$$Y_1, Y_2, \ldots, Y_s = \phi_1(X_1), \ldots, \phi_s(X_2), \ldots, (X_s) \quad (6)$$

$$Y = \hat{\phi}(Y_1, Y_2, \ldots, Y_s) \quad (7)$$

The context of scenes in AV driving can vary dramatically: from different lighting conditions, to different road types and locations, to weather conditions that can severely degrade specific sensors. This variance calls for the use of an adaptive φ that is not only determined by a set of static scene conditions, but is instead learned within the model. In this case, φ represents an ensemble of object detection models, and φ* represents the expected best subset of models in the ensemble for a given input X. The contextual information of a scene (either learned or modeled from the inputs or provided externally) was denoted as Ω:

$$\Omega = \pi(X), \phi^* = \rho(\Omega), Y = \phi^*(X) \quad (8)$$

where π represents a context identification model, and ρ represents the mechanism for selecting φ* given the identified context Ω. The goal of π and ρ is to select the optimal subset of branch models φ for the inferred context Ω to maximize object detection performance for a given X. It is posited that this general problem formulation can be extended to other sensor fusion problems in multi-sensory computing systems.

The present invention processes input data from different modalities to produce the desired targets. First, sensor data from each modality is processed by a modality-specific CNN (denoted as "stem") to produce an initial set of features F. Next, these features are used by the gating module (containing π and ρ) to identify the context Ω and select which subset of branches φ* should be executed for this context. Each branch is a deep-learning model capable of converting the features extracted from a subset of sensors F* to produce a set of outputs for a specific task (e.g., object detection). After the selected subset of branches is executed, the branches pass their outputs Y* to the fusion block, which fuses them to generate the final object detections Y.

Figure 1A:
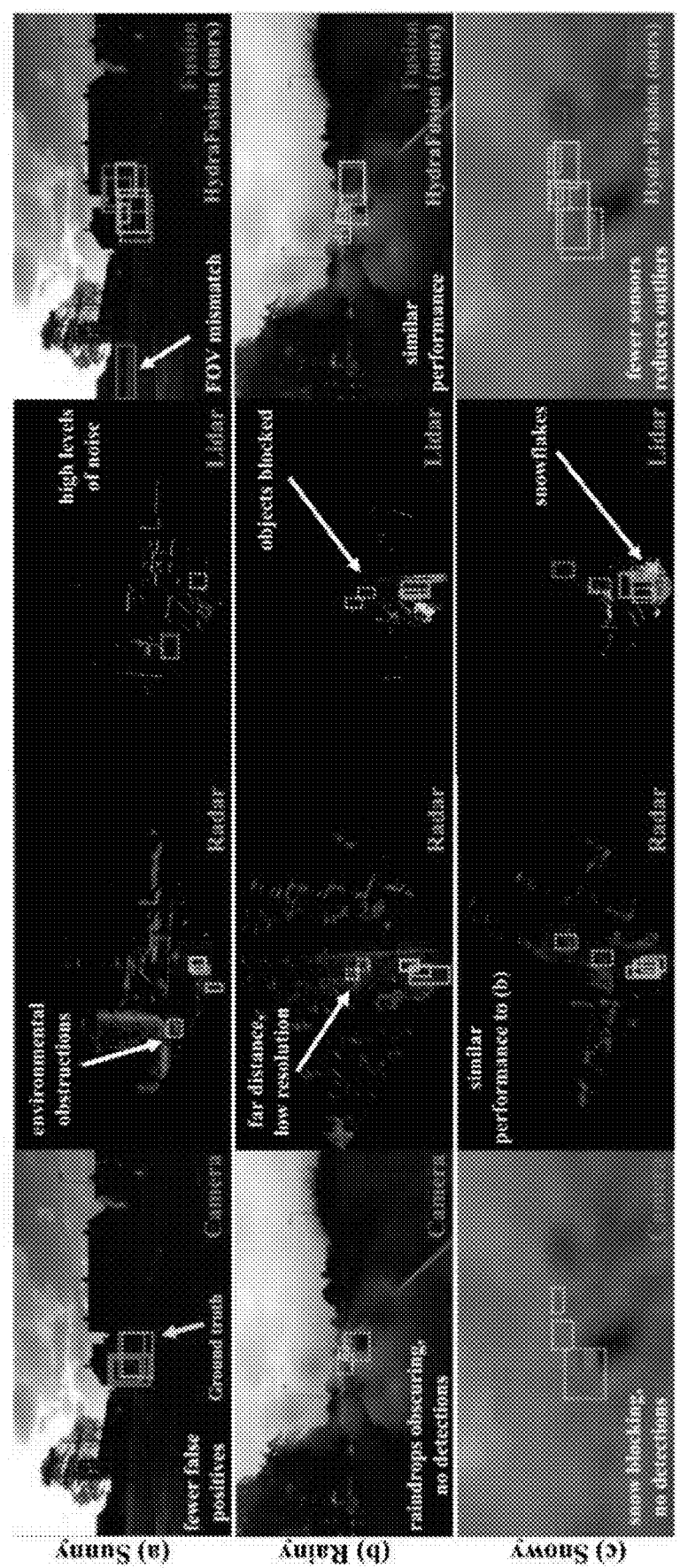
FIG. 1B shows a schematic of the system of the present invention.
Figure 1B:
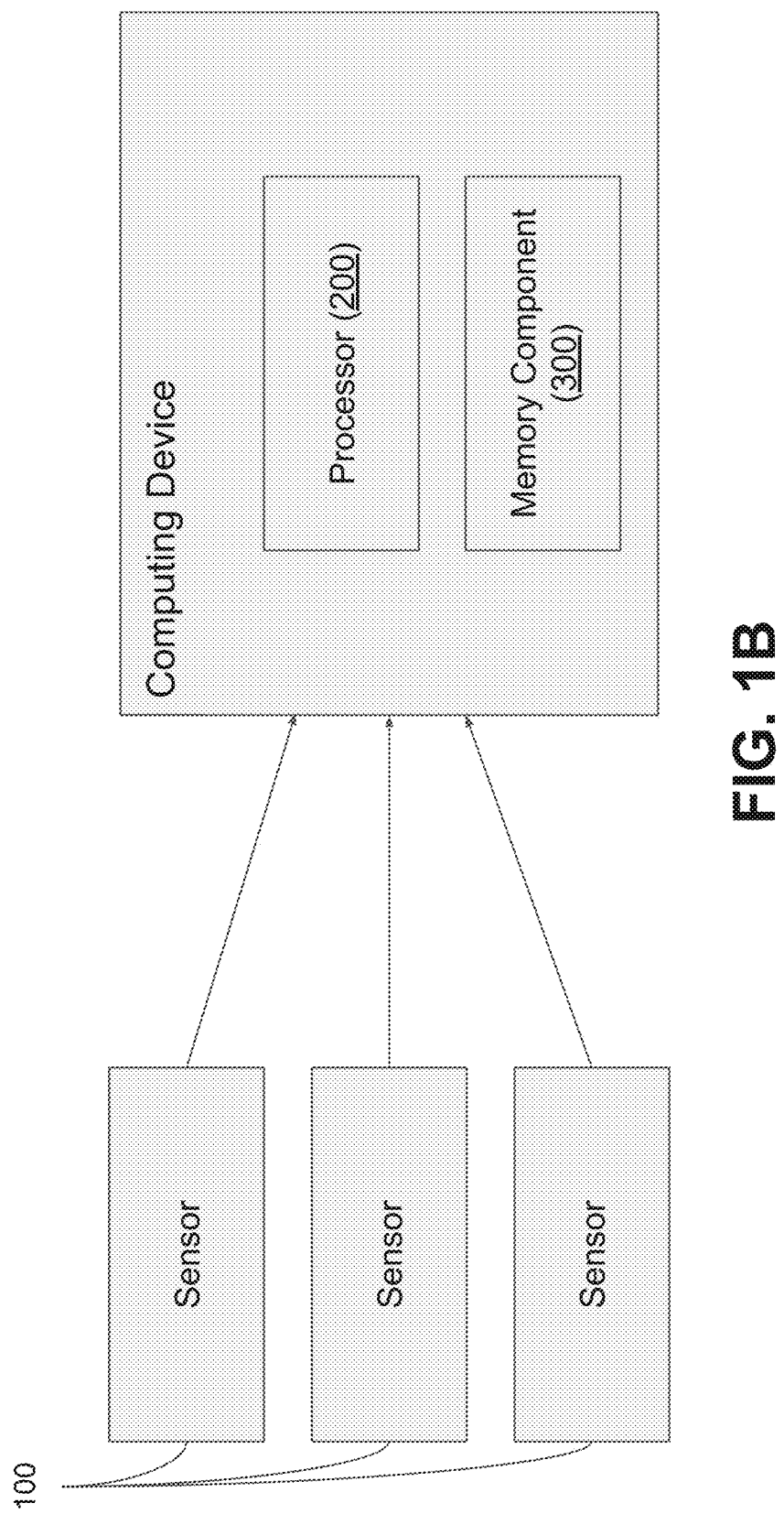
Figure 2:
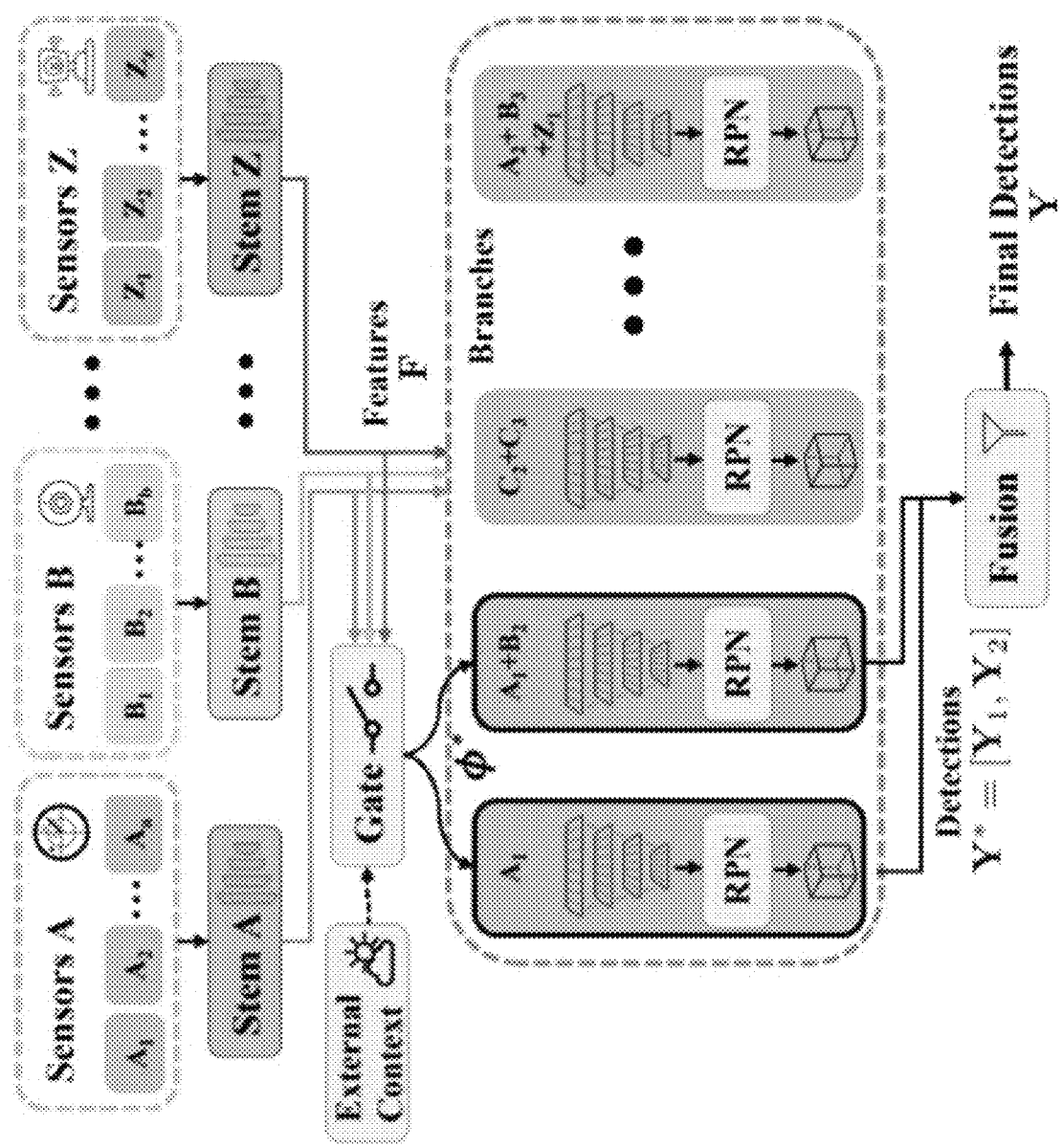
FIG. 2 shows the architecture of the present invention.

As shown in FIG. 2, the present invention accepts any number of sensors and sensing modalities as input. Each stem is implemented as a CNN, which generates an initial set of spatial features for each sensor. The present invention implements a shared stem block for processing all the sensors for a given sensor modality. Thus, there will be three stems if the implementation uses the camera, radar, and lidar sensors. After the input from each sensor for a given modality is passed through the stem, the gate module uses the resulting features to identify the context and select which branches to execute. Then, the selected branches use the stem output features as inputs to generate their predicted object detections.

Figure 3:
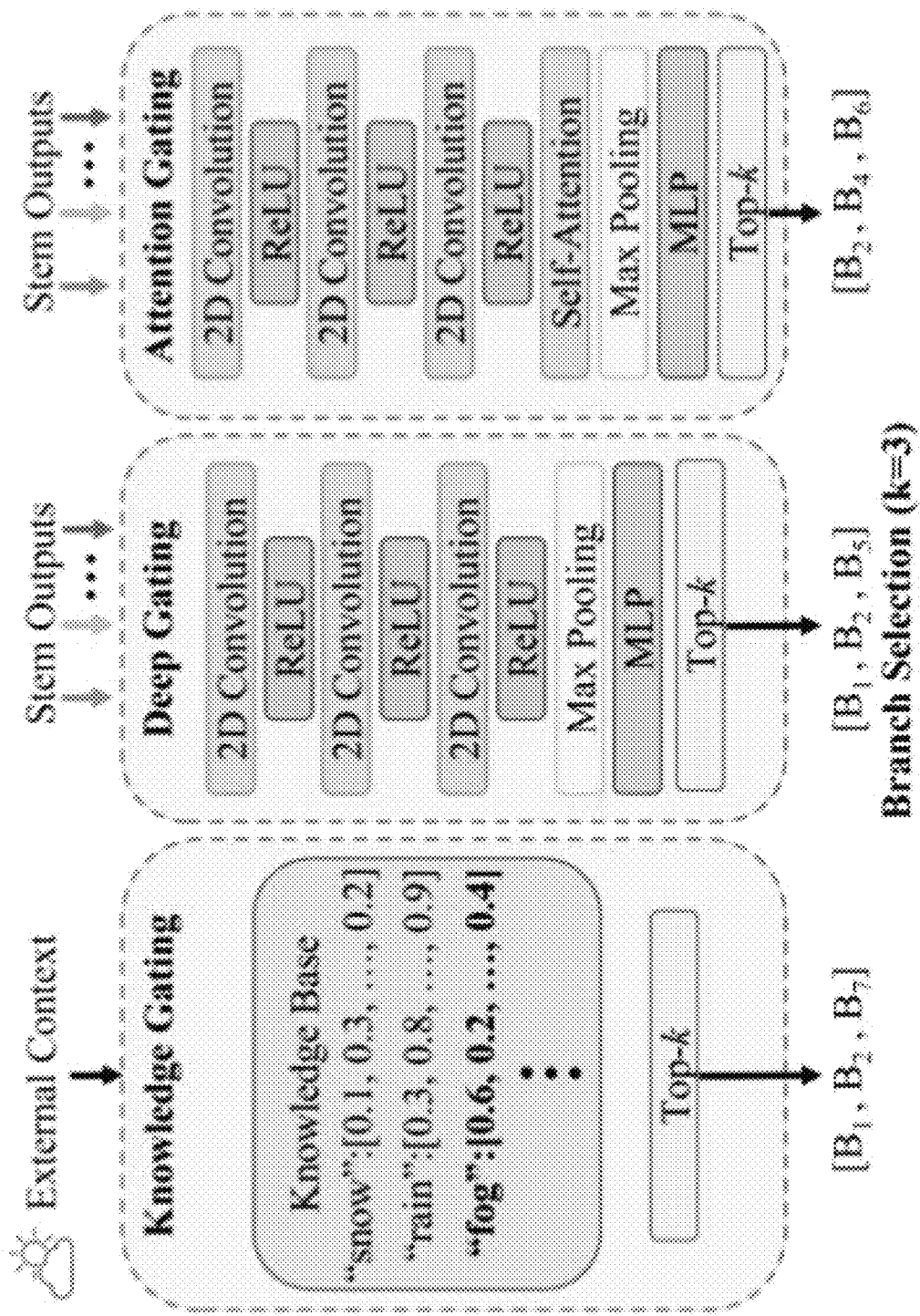
FIG. 3 shows examples of gating architectures implemented in the present invention.

Context identification is important for selecting the appropriate subset of branches to maximize performance in a given context. Several different gating algorithms are implemented for this task. The goal of the gate module is to rank the branches based on their expected performance for the input set of stem features. Next, the top-k branches (where k is configurable) are selected for execution and fusion to maximize object detection performance. The architectures of the three gating models are shown in FIG. 3.

Rigid Knowledge-Based Gating: Since there exists some domain knowledge as to how each context will affect each sensing modality, the present invention can implement Knowledge Gating, where this domain knowledge is used to statically encode the subset of branches to execute for a given context. This assumes the set of possible contexts is finite, and the current context can be identified via external sources. For example, weather information, time of day, and map data can all be used to define the current context. In the present invention, the set of fixed contexts is defined based on metadata from the RADIATE dataset describing the type of driving data in each sequence. Thus, the set of fixed contexts is: {city, motorway, junction, rural, snow, fog, and night}. Domain knowledge from Table 1 is leveraged from the RADIATE paper to rank the relative performance of each sensor in each fixed context. Then, at run-time, the external context information (e.g., data from a navigation/weather system) is used to identify the current context. The top-k ranked branches for that context are selected to be executed and fused. The limitation of this gating strategy is that it requires a fixed context definition, potentially limiting performance in cases where contexts are less rigidly defined. With the other gating strategies, the context is defined as a continuous feature space to enable the modeling of more complex contexts.

Learned Dynamic Deep Gating: In Deep Gating, the present invention implements a CNN followed by a multi-layer perceptron (MLP) to model the relationship between the output of the features from the stems and rank the branches based on their expected performance for this feature set. The outputs of the CNN are flattened to one dimension before being passed to the MLP. In this gating method, the context can be viewed as a continuous feature space defined by the stem outputs.

Attention-Based Dynamic Gating: In some contexts, certain regions of the feature map may be more informative than others about the scene's context and, consequently, the branch-wise performance. The present invention implements an attention-based gating strategy, denoted as Attention Gating, that infers an attention map over the stem features to evaluate this hypothesis. This attention map is used with CNN and MLP layers to model the relationship between branch performance and stem features.

Optimal Loss-Based Gating: To serve as a performance target for the gating approaches, a so-called "optimal" gating strategy is implemented where, for a given input, the branch ranking output by the gate module is equal to the inverse of the aggregated branch loss for the output of the detection by each branch. Since the actual branch loss is used to inform the gate a posteriori, this strategy is not feasible for real-world deployment. However, it gives the theoretical best-case performance of a gating strategy that can perfectly rank the branches based on their losses for a given input.

The branches of the proposed framework are designed to be specific to different sensor fusion combinations. These pairings can enforce early fusion in the model by combining the stem features of heterogeneous sensor inputs (e.g., radar and lidar) before performing object detection. Furthermore, some branches use singular sensor inputs (e.g., radar) that the gating module may choose in scenarios where other sensors (e.g., camera and lidar) have poor performance due to situational factors (e.g., weather or obstruction). Each branch is equipped with a Region Proposal Network (RPN) that uses anchor generation techniques to predict detections across a feature map. These predictions are then fed through a region-of-interest layer that generates the following outputs for each detection: bounding box coordinates [µ1, v1, µ2, v2]—expressed in the native coordinate frame, scores [0-1]—confidence level of the detected object, and labels {1, 2, 3, ..., k}—the assigned classification of the object. The outputs from each branch are passed to the fusion block to generate the final set of fused detections.

The function of the fusion block in the present invention is synonymous with the concept of late fusion. In the present invention, the following fusion algorithms are implemented to fuse the output of the detection by all of the active branches of the model.

Non-Maximum Suppression (NMS): This algorithm calculates the intersection over union (IoU) of corresponding bounding box estimations, and based on their confidence scores, selects which box estimates to keep. The equation for calculating the IoU (sometimes referred to as the Jaccard index) between two sets, A and B, is given by:

$$IoU(A, B) = \frac{|A \cap B|}{|A \cup B|}, \quad (9)$$

where ∩ represents the intersection, and ∪ represents the union. In the present application, the sets are the rectangular bounding box predictions. By iteratively comparing bounding box predictions and returning a match if the IoU is above a defined threshold, only the box with the highest confidence score is kept among each set.

Soft-NMS: A further refinement of NMS, which lowers confidence scores using a Gaussian weighting function defined by σ, if the boxes are above a threshold IoU value. Unlike NMS, Soft-NMS does not completely remove box estimates, which can result in more false positives.

Weighted Box Fusion (WBF): This approach clusters the bounding box predictions into distinct lists by iterating over the boxes and calculating IOUs with respect to thresholds. From each cluster, the fused bounding box predictions, [$f_\mu$, $f_v$], are computed as weighted sums of each detection and its confidence score:

$$f_{\mu_j} = \frac{\sum_{i=1}^{n} C_i \cdot \mu_{i,j}}{\sum_{i=1}^{n} C_i}, f_{v_j} = \frac{\sum_{i=1}^{n} C_i \cdot v_{i,j}}{\sum_{i=1}^{n} C_i} \quad (10)$$

where $j \in \{1, 2\}$, $\mu_{i,j}$ and $v_{i,j}$ are the corresponding locations of the bounding box points, and CI is the confidence score for the ith box. WBF also has a skip-box threshold that defines which boxes to exclude if they are below a certain confidence score. Furthermore, each branch can be assigned varying weights that can be tuned within the overall model or application being used.

The present invention features a novel adaptive sensor fusion approach that jointly optimizes performance and energy consumption by identifying the context of an environment before subsequently adapting the model and fusion architecture. The model can: (i) adapt between using no fusion, early fusion, and late fusion, (ii) select from one or more radar, lidar, or camera sensor inputs, and (iii) execute different types of fusion simultaneously depending on what it determines is the best execution path to minimize loss and energy consumption in the current context jointly.

Figure 5:
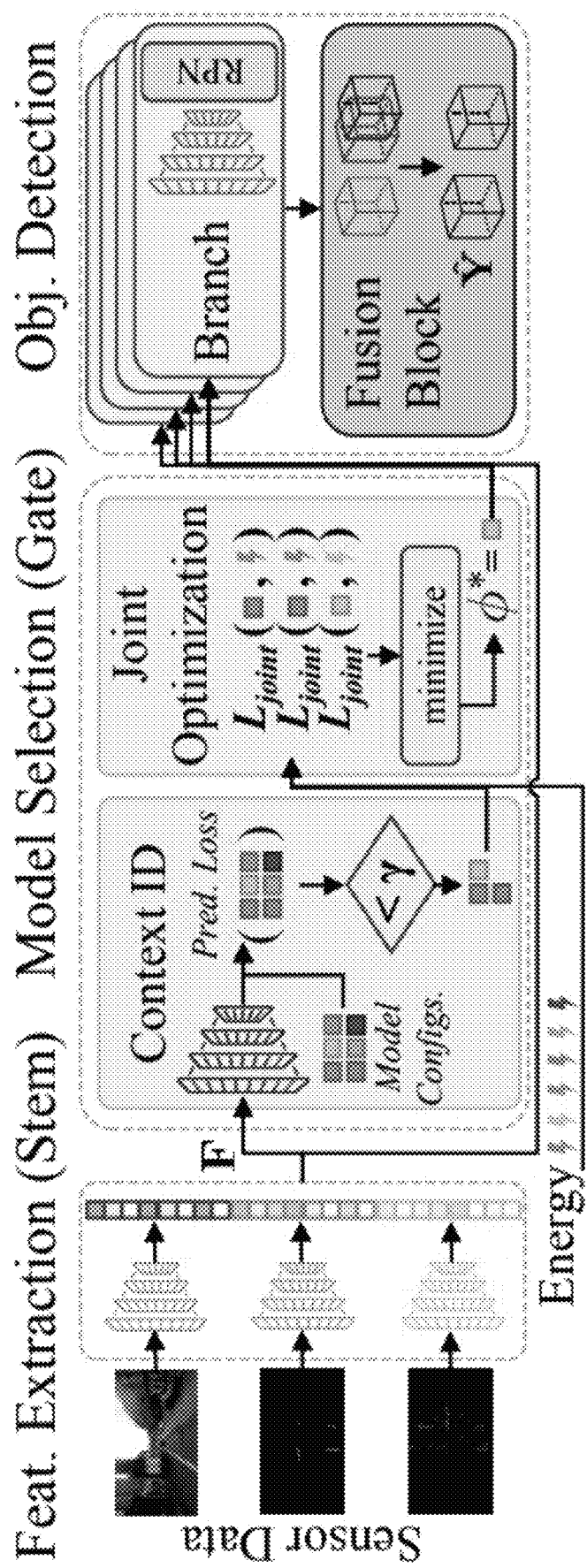
FIG. 5 shows an alternate framework of the present invention.

The workflow for this approach is shown in FIG. 5. First, sensor measurements are passed through modality-specific stem models, which produce an initial set of features F for each sensor. Next, the gate model uses F and the set of possible model configurations Φ to estimate the loss of each possible configuration for the given inputs. After selecting the candidates for optimization using γ, these candidates Φ*, their known energy consumption E, and their estimated losses $L_f$ were passed to produce $L_{joint}$ for the optimization function. Then, the φ with the lowest $L_{joint}$, denoted φ*, is selected to execute as. Since each φ represents an ensemble of one or more object detectors, denoted as branches, each branch in φ* was run with its expected inputs and collect the results Ŷ*. These are then fused using the late fusion block, producing a final set of detections Ŷ. The following subsections elaborate on the different components in the present approach.

The stem models are implemented as a small set of CNN layers that produce an initial set of features for each input modality. The stems are modality-specific, so there is one stem for each type of sensor used. The collection of features F output by the stems is collectively passed to the gate model to identify the context and select the set of branches to execute. Then, F is input to the selected branches.

Several gating strategies were implemented to estimate the fusion losses of each sensor configuration and facilitate the selection of φ*. The goal of each gating model is to (i) identify the context based on the input features, (ii) estimate the performance of each model configuration in the context, and (iii) compute the optimization result and use it to select φ*.

Knowledge Gating approach uses domain knowledge on the performance of each modality in different driving conditions to statically decide the best configuration for each rigidly-defined driving context (e.g., rain, snow, city, motorway). This gating approach assumes the context can be identified from external sources, such as weather information, GPS location, and time of day. Also, it assumes that the set of possible contexts is finite, which may limit scalability.

The deep learning approach uses a deep-learning model with three CNN layers and one MLP layer to predict the loss for each model configuration for a given set of inputs. Then, the optimization function is run on these outputs.

The attention-gating approach is identical to the Deep Gating model, except for the addition of a self-attention layer to enable the gate to identify important areas of the input feature map.

In the loss-based gating strategy, the a posteriori ground-truth loss from each configuration for a given input is used to select φ*. Thus, this implementation is not deployable in the real world but represents the theoretical best-case performance for a gate model that can perfectly predict the fusion loss of every configuration for every input.

EXAMPLE

The following describes a non-limiting example of the present invention workflow applied to an alternative multi-sensory computing system:

The present invention took in as inputs data from any number of heterogeneous, or similar, physiological sensors. Preprocessing is a common step when dealing with raw, unfiltered sensor data. By applying various filters (e.g., band-pass filters or lowpass filters) to the input data, random noises were reduced and important features were more easily extracted.

The purpose of the context identification block was to select the branch classifier(s) based on the context of the motion. It first extracted only tri-axis accelerometers (ACC) features as they were directly related to the relative motion of the test subject. These features were then processed by the gating model to select the best-performing branch. The feature extraction of the three other modalities took place after the gating model has selected which branch(es) will be run.

The gating model trained a classifier that used the ACC features as inputs to select one of the available branch classifiers for branches B1={blood volume pulse (BVP), electrodermal activity (EDA), skin temperature (TEMP)}; B2={ACC, BVP, EDA}; B3={BVP, EDA}. A Decision Tree (DT) classifier was used for the gating model, as it is lightweight and adds minimum overhead for the present architecture.

An important feature of the present invention was its ability to balance constraints between performance and energy. The term δ was introduced which aided the gating decision in considering this trade-off. The gating model outputted prediction probabilities for the available branches with ⁻b representing the maximum probability branch. δ had a range between 0 and 1, representing the range in which non-maximum branches were selected by allowing branches with probabilities greater than ⁻b−δ to be also selected. Lower δ values indicate tighter energy constraints, with δ=0 indicating that only the highest probability branch from the gating classifier was selected, while higher δ values allowed more branches to be selected, with δ=1 indicating that all possible branches were selected.

Once the branches were selected after applying δ on the gating model decision, the features for those branches were extracted and concatenated together to be passed to the corresponding classifiers. For example, $B_1$ and $B_3$ were the selected branches from the gating model. In this example, the features from BVP, EDA, and TEMP signals were concatenated together using early fusion and fed to the branch classifier for $B_1$, with $B_3$ operating in similar fashion for its sensor modalities.

Next, the corresponding branch classifier(s) were used to perform classification of the segment. For this approach, a Random Forest (RF) classifier was used for all three branches. Each selected branch output a classification prediction to be fused by the late fusion method.

The late fusion method was tasked with fusing the class predictions from the various selected branches, $\{\hat{Y}_1, \hat{Y}_2, \ldots, \hat{Y}_s\}$, with the goal of producing higher accuracy predictions than any one individual branch by itself. Here the novel Kalman filter-based method was implemented for classification over an ensemble of classifiers, although any applicable late fusion method is supported within the present invention.

Kalman filters are a powerful and commonly used tool for sensor fusion and the broader field of estimation. They are designed to estimate the unknown state of a system along with the state's uncertainty, by performing a series of recursive predictions and measurement updates. In the context of this problem, a Kalman filter approach was implemented towards the multi-class classification problem, however, the temporal dynamics in the stress classification problem were additionally modeled for each sample at time k. The general form of the discretized linear dynamics of a system with state x and measurements z was given as:

$$x(k)=Fx(k-1)+v(k) \quad (11)$$

$$z(k)=Hx(k)+w(k) \quad (12)$$

where F is the state transition matrix; v is the process noise vector, which is modeled as a zero-mean, normally distributed random variable with covariance, Q; H is the measurement matrix relating the state to the measurements; and w is the measurement noise vector, which also is zero-mean with a normal distribution and covariance, R.

During the prediction step of the Kalman filter, the state estimate and its estimation error covariance matrix, P(k), were propagated forward through the dynamics model with the added process noise. This step enforced the temporal dependency that the stress class probabilities at the current time step have on the future time step. The prediction equations were as follows:

$$x(k|k-1)=F\,x(k-1|k-1), \quad (13)$$

$$P(k|k-1)=F\,P(k-1|k-1)F^T+Q(k-1), \quad (13)$$

where the notation (k+1|k), indicated the next time step given the current time step. Next, during the update step, measurements were processed and updated estimates of the states and their covariance were corrected according to the measurements. The measurement update equations are as follows:

$$x(k|k)=x(k|k-1)-K(k)[H(x(k|k-1)-z(k)] \quad (15)$$

$$P(k|k)=P(k|k-1)-K(k)HP(k|k-1) \quad (16)$$

$$K(k)=P(k|k-1)H_T[HP(k|k-1)H_T+R(k)]^{-1} \quad (17)$$

with K representing the Kalman gain. The prediction and update steps were iterated to produce an estimate of the state, x, and its associated estimation error covariance, P, representing the uncertainty involved with the state estimate.

For this case, the multi-class classification problem was abstracted as follows. The unknown state the filter was attempting to estimate was the probability of each class during each segment. Thus, x was a c dimensional vector of estimated class probabilities. Additionally, the predictions from each separate classifier were the measurements z, which were processed sequentially per time step. This allowed for s* measurement updates per iteration where s* was adaptively selected per sample by the gating model:

$$\hat{Y}_{kf}=\arg_c\max x \quad (18)$$

where x is the state vector from the Kalman filter. To validate the Kalman-filter based method, its performance was benchmarked against commonly used voting mechanisms for late fusion: hard-voting and soft-voting. The method of hard-voting assigned the final class based on the class most commonly voted by each classifier, whereas soft-voting selected the class with the highest average value across all the classifiers.

The following is a non-limiting example of the present invention. It is to be understood that said example is not intended to limit the present invention in any way. Equivalents or substitutes are within the scope of the present invention.

The dataset contained annotated data from a Navtech™ CTS350-X radar, a Velodyne™ HDL-32e LiDAR, and a ZED™ stereo camera. With this dataset, the models were trained and evaluated on object detection using supervised learning. The dataset contained data for various driving contexts, including urban driving, snow, rain, fog, night, and motorway driving. In some cases, several sensors were visually obstructed by fog, rain, or snow. The dataset contained the following annotated object classes: {car, van, truck, bus, motorbike, bicycle, pedestrian, group of pedestrians}. This dataset provided a challenging benchmark on which the robustness of object detection models were evaluated for a range of driving contexts. They additionally presented object detection results using radar in varying weather conditions. The experiments used a 70:30 train-test split for training and evaluating the models.

To evaluate the present invention in comparison to the baseline fusion approaches, each stem was implemented and branched as a Faster R-CNN model with a ResNet-18™ backbone. The ResNet-18™ models were split at the first block and used as the stem for each modality. Then, the remaining ResNet-18™ layers and the RPN of Faster R-RCNN were used in each branch.

With four sensors (two cameras, lidar, and radar), the total number of possible unique branches was $2^4-=15$. However, the training and space complexity of a 15-branch model may be much larger without providing noticeable improvements in precision. Thus, domain knowledge was used to identify the best branches for the application by picking branches that could cover the limitations of other branches in difficult contexts. Thus, the present exemplary implementation contained four single-sensor branches and three early fusion branches, for a total of seven branches. The single-sensor branches were: Left Camera, Right Camera, Lidar, and Radar; the early fusion branches were L/R Cameras, Lidar+Radar, and L/R Cameras+Lidar. For single-sensor branches, the stem features for the sensor were used as the input for the branch. For branches with early fusion, the present invention concatenated the stem features for each sensor to be fused across the channel dimension. Then, a 2D convolution layer was used to fuse this concatenated output before passing the result to the remaining ResNet-18™ layers in the branch.

Regarding the fusion block, the three fusion algorithms implemented used the following thresholds during the experiments: IoU threshold=0.4, skip-box threshold=0.01, σ=0.5. Due to computation constraints, only ResNet-18™ was evaluated; however, this architecture could be directly used with larger image-processing models (e.g., ResNet-34/50/152™, DenseNet169™, VGG-16) by simply changing the image processing backbone and picking a different split-point to divide it between the stems and the branches.

Deep convolutional networks were implemented for the Deep and Attention Gating methods. As shown in FIG. 3, the Deep Gating model was implemented as a 3-layer CNN with an MLP layer to map the CNN output to seven output channels, corresponding to the branch ranking for the seven branches. The Attention Gating method differed in that a self-attention layer was added after the CNN but before the max pooling and MLP layers. The Deep and Attention Gating methods were evaluated to estimate the aggregated loss of each branch for a given input using regression with mean absolute error as the loss function. The top-k lowest loss branches predicted by the gate were selected for fusion. To prevent the gate model training process from affecting the training process of the present invention model, the gating modules were trained and evaluated separately using the stem outputs and branch losses of a fully trained model as the inputs and targets for the gate. After training, the gate model was reintroduced into the present invention model for deployment.

The Knowledge Gating approach used external context and domain knowledge to inform the branch ranking. During inference, the knowledge base was queried using the external context for each input and returned the branch rankings defined for that context. For the Optimal Gating method, the loss between the ground-truth boxes and the branch outputs was taken for each branch, and used this information to rank the branches—the branches with the lowest aggregated loss were ranked the highest.

Since the dataset contained data from both forward-facing (stereo cameras) and birds-eye view (radar and lidar) perspectives, a transformation matrix was used to transform the predicted bounding boxes from the birds-eye view (BEV) sensors to the forward-facing perspective (FWD). This enabled fusion of the detections from both perspectives in the fusion block. To allow a fair assessment in the analysis across the different sensor modalities, the cameras' field of view was chosen to be the fused reference frame as it was the limiting factor since it covered the least area. This prevented the objects detected by the lidar and radar branches from dominating the model when objects were detected outside the cameras' field of view. This approach could be directly applied in scenarios with full 360-degree camera coverage without loss of generality.

Each model was built, trained, and evaluated in PyTorch™ using a batch size of 1 with a learning rate of 5e-3 for training the stem/branch models and 5e-5 for training the gate models. All of the branches were trained simultaneously on the dataset and averaged the loss across the branches before backpropagating in each training update step. The classification and box regression loss was computed for each branch using the multi-task loss function defined and used in Faster R-CNN.

To score the models on object detection, the mean average precision (mAP) score was used, which is widely utilized as the primary metric for benchmarking object detection models. The mAP for boxes was computed with an intersection-over-union (IoU) ≥0.5, which aligns with the PASCAL™ Visual Object Classes (VOC) Challenge. Precision (P) and recall (R) for each class in the dataset are defined as:

$$P=TP/(TP+FP), R=TP/(TP+FN) \quad (19)$$

where T P, FP, and FN represent the number of true positive, false positive, and false negative classifications, respectively, by the model at a set confidence threshold. Average precision (AP) is a measure of the area under the precision-recall curve and is calculated as follows:

$$AP=\Sigma_n(R_n-R_{n-1})P_n \quad (20)$$

where $R_n$ and $P_n$ correspond to the recall and precision at threshold n on the precision-recall curve. The maP was calculated across detections above the IoU threshold as the mean of the AP across all object classes where every object instance is weighted equally.

Object Detection Results: In FIG. 9B, the mAP achieved by different model configurations on the dataset is shown. Results are shown for (i) individual sensors, (ii) early fusion between sensors, (iii) late fusion between sensor-specific branches, and (iv) the present invention approach. For the results in sets (i) and (ii), the mAP was calculated from a single ResNet18™ FasterRCNN model taking the stated sensor data as input. The late fusion results were computed by processing each sensor modality separately through a ResNet18™ FasterRCNN model and fusing the outputs of each model using one of the three fusion algorithms (WBF, NMS, or Soft-NMS). All-Branches (Early+Late) was the result from running all of the branches in the present invention and fusing the results using the fusion algorithms. Set (iv) shows the results for the selective sensor fusion approach using the Attention Gating method to select the Top-3 branches for each input.

Figure 4:
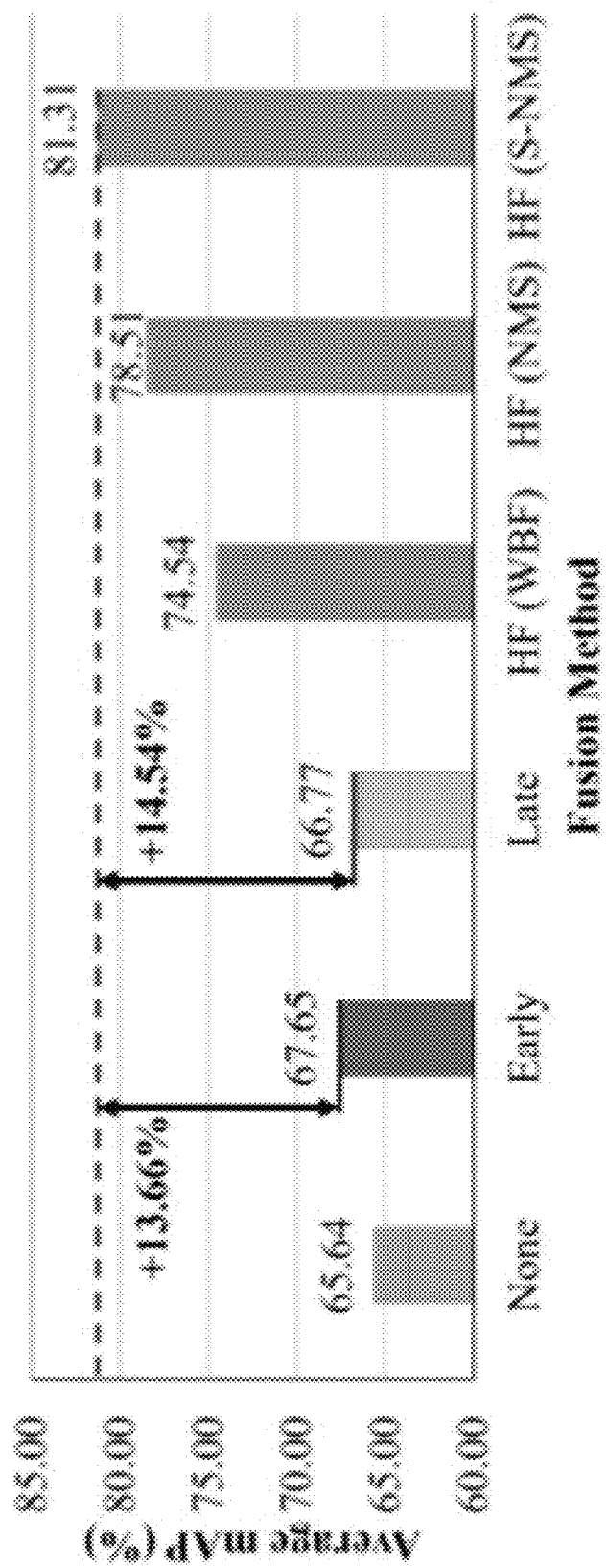
FIG. 4 shows a graph of the average mAP for each fusion method compared to the present invention.

Interestingly, All-Branches performed worse than all the results in (iv), supporting the hypothesis that using less sensor data could improve robustness. The tradeoffs between early and late fusion approaches were also shown. Early fusion performed better with fewer sensors if the sensors provided good quality data (Radar+Lidar). In comparison, late fusion was more robust to bad data but required more sensors to achieve good performance (Radar+Lidar+L/R Cameras). The table also shows the benefits of fusion compared to single-sensor approaches, as all fusion variants outperformed (i) in at least one configuration. FIG. 4 shows the average mAP for each fusion method. As shown, the present invention significantly outperformed both early and late fusion approaches on average (by 13.66% and 14.54%, respectively), achieving a peak mAP of 81.31%. Overall, the results supported the hypothesis that a context-aware selective sensor fusion architecture was significantly more robust and accurate than existing fusion methods.

Next, the proposed gating strategies were evaluated. To evaluate the impact of different subset sizes k on each of the proposed gating methods, the mAP was computed after fusion for $k \in \{1, 3, 5, All(7)\}$ with WBF, NMS, and Soft-NMS fusion. Optimal Gating represented the theoretical best performance if the k lowest-loss branches were selected for each input.

Attention Gating using Soft-NMS achieved the best mAP for 3-branch fusion, with a score of 81.31% (only 0.26% less than Optimal Gating). This likely resulted from its capability to identify the regions in the input that were most relevant to the output. Deep Gating was the second-best approach with an mAP of 78.14% for 3-branch fusion as it was still able to identify the context well using the stem features.

Interestingly, Knowledge Gating performed best for k=1, likely because the domain knowledge was sufficient to determine the best modality for each context. However, Knowledge Gating did not achieve as high of an mAP score as Deep and Attention Gating for any k, meaning that its performance across contexts was generally worse. Besides, in real-world deployments, k=1 would be insufficiently robust to sensor obstruction or failures, so k=1 performance was less relevant to real-world use cases than $k \in \{3, 5, All\}$ performance. For the present application, k=5 and k=All did not perform as well as k=3. Overall, the results show that Attention Gating with 3-branches results in the highest object detection mAP score (4.94% higher than Knowledge Gating) and was thus the best configuration to use on an actual vehicle.

Figure 6:
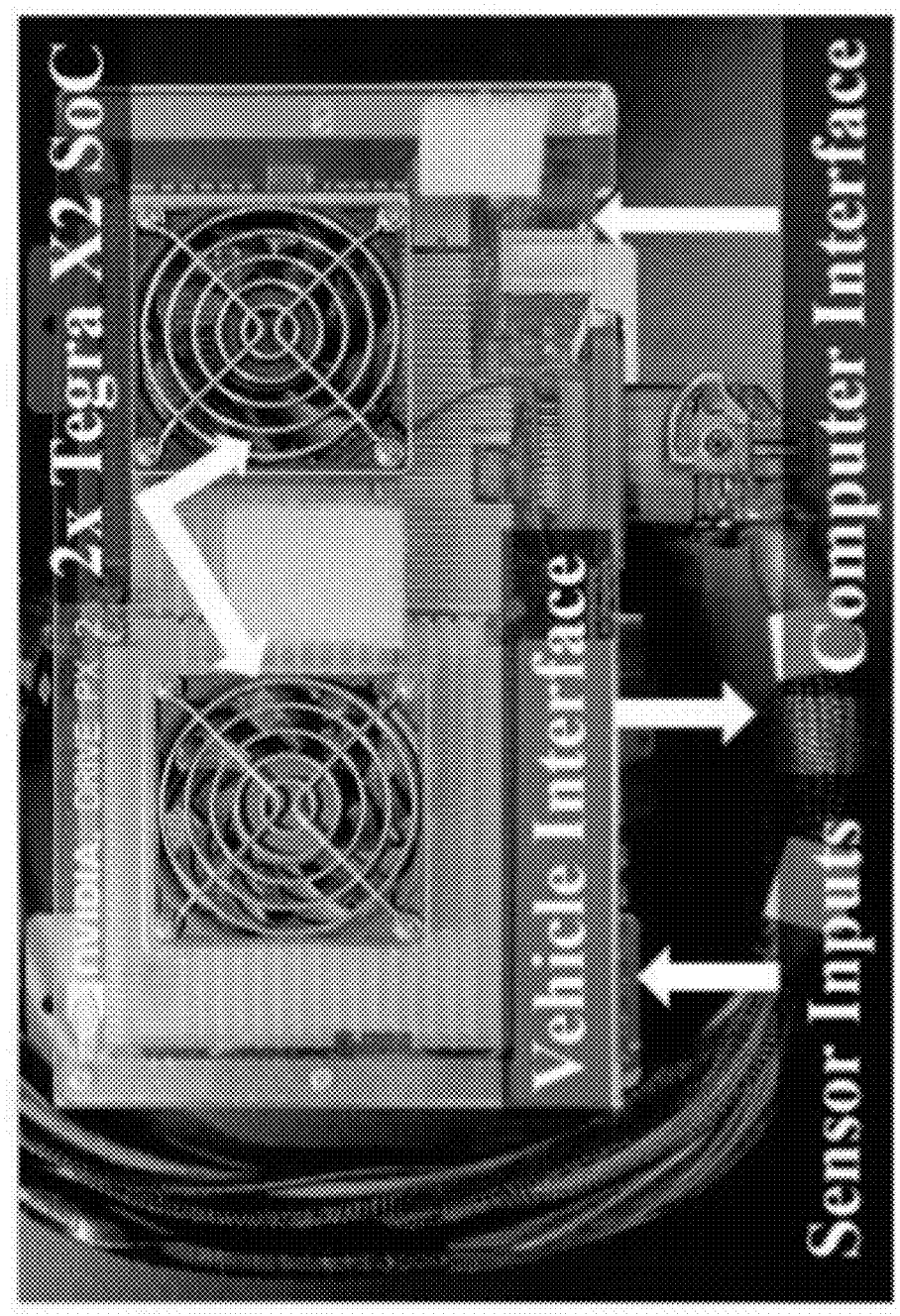
FIG. 6 shows a Nvidia® Drive PX2 Testbed as used in the experimentation of the present invention.

To demonstrate that the present approach was practical for real-world deployment, the energy consumption, latency, and memory usage of the model were analyzed on an industry-standard AV hardware platform, the Nvidia™ Drive PX2, shown in FIG. 6. To perform hardware analysis, each model specification was compiled using TensorRT and used built-in tools to measure its end-to-end latency and memory usage. Then, this value was multiplied by the power consumption of the system measured via an external power meter to obtain the energy consumption.

In FIG. 9C, the results are shown for running different model variations including single sensor models, early fusion models, late fusion models, and the present invention methodology. The present invention 3-branch results shown are for the worst-case energy and latency scenario where all three branches selected by the gate were early-fusion branches. Similarly, the present invention 5-Branch result was with three early-fusion branches and two single-sensor branches selected. The present invention results were shown with Deep Gating and Attention Gating modules. As expected, the single-sensor and early fusion methods were the least demanding on hardware since they only used a single ResNet-18™ Faster R-CNN model; however, they also achieved lower mAP scores overall, as shown in FIG. 9B. The results showed that the present invention 3-Branch configurations had energy consumption, latency, and memory usage that was comparable to 3-sensor and 4-sensor late fusion models. This result meant the present invention can reasonably be used in multi-sensory computing systems where late fusion approaches are currently deployed. Since the present invention achieved significantly higher mAP than both early and late fusion methods, it presents clear benefits over state-of-the-art methods. The 5-branch in the present invention was slower and less energy efficient than 3-branch and also achieved a lower mAP score, so 3-branch would be preferred for real-world implementation. For both 3-branch and 5-branch embodiments, Attention Gating was slightly more efficient than Deep Gating, likely because TensorRT better optimized its architecture.

The following is another non-limiting example of the present invention. It is to be understood that said example is not intended to limit the present invention in any way. Equivalents or substitutes are within the scope of the present invention.

In the experiments, a dataset comprising annotated real-world object detection data from an AV was used with the following sensors: a Navtech™ CTS350-X radar, a Velodyne™ HDL-32e lidar, and a ZED™ stereo camera. The following classes of objects were annotated in the dataset: {car, van, truck, bus, motorbike, bicycle, pedestrian, group of pedestrians}. The dataset consisted of various difficult driving contexts (e.g., rain, fog, snow, city, motorway) that were challenging for typical object detectors. In the present invention, a 70:30 train-test split was used across the dataset and trained the model with all of the stems and branches enabled using supervised learning. Next, the trained stem and branch outputs were used to separately train the gate model to select the branches that produced the lowest loss for a given stem output (F). Each model's performance was evaluated at object detection using average loss and mean average precision (mAP), which was widely used for benchmarking object detection models. The mAP was computed for bounding boxes with an intersection-over-union (IoU) ≥0.5, aligning with the PASCAL Visual Object Classes (VOC) Challenge.

Figure 7:
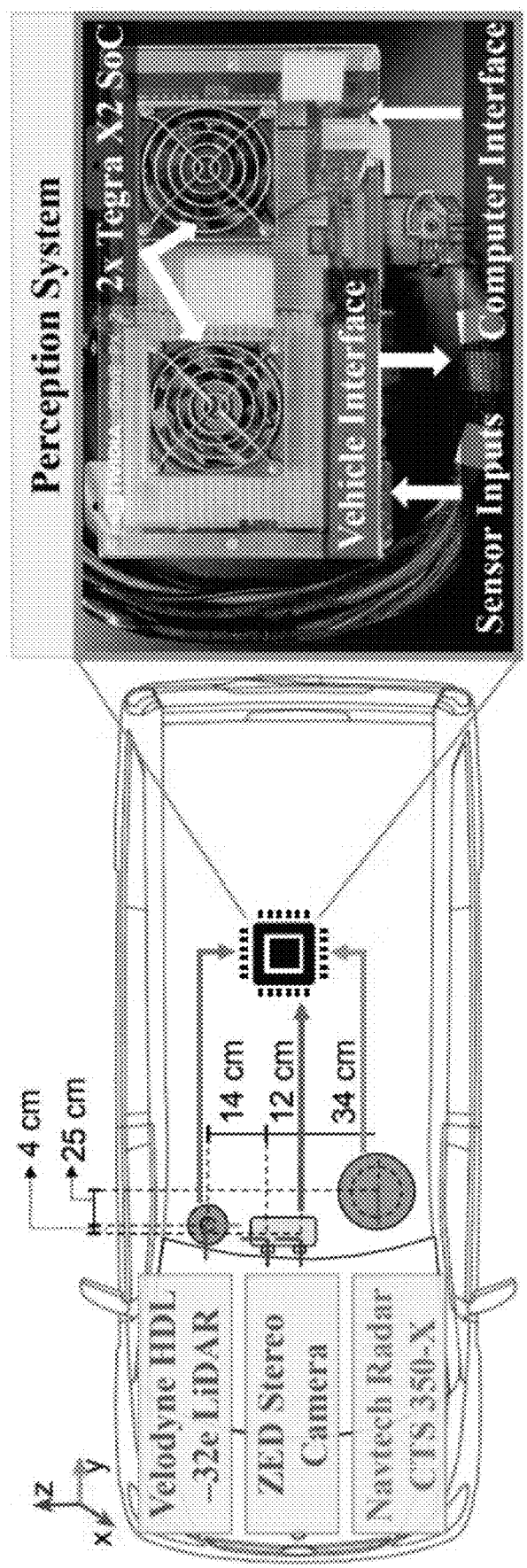
FIG. 7 shows a sensor diagram with the Nvidia™ Drive PX2 as used in the experimentation of the present invention.

The energy consumption of each model configuration was calculated $\phi \in \Phi$ on the Nvidia™ Drive PX2 shown in FIG. 7. T energy consumed by the gate models was ignored as they have negligible energy consumption (<0.005 J) compared to the stems and branches of the model after TensorRT™ compilation. In all experiments, γ=0.5 as it was experimentally determined that it ensured performance at least as good as early and late fusion while enabling energy optimization. However, it is noted that γ could be tuned based on the requirements for a given application.

Figure 8:
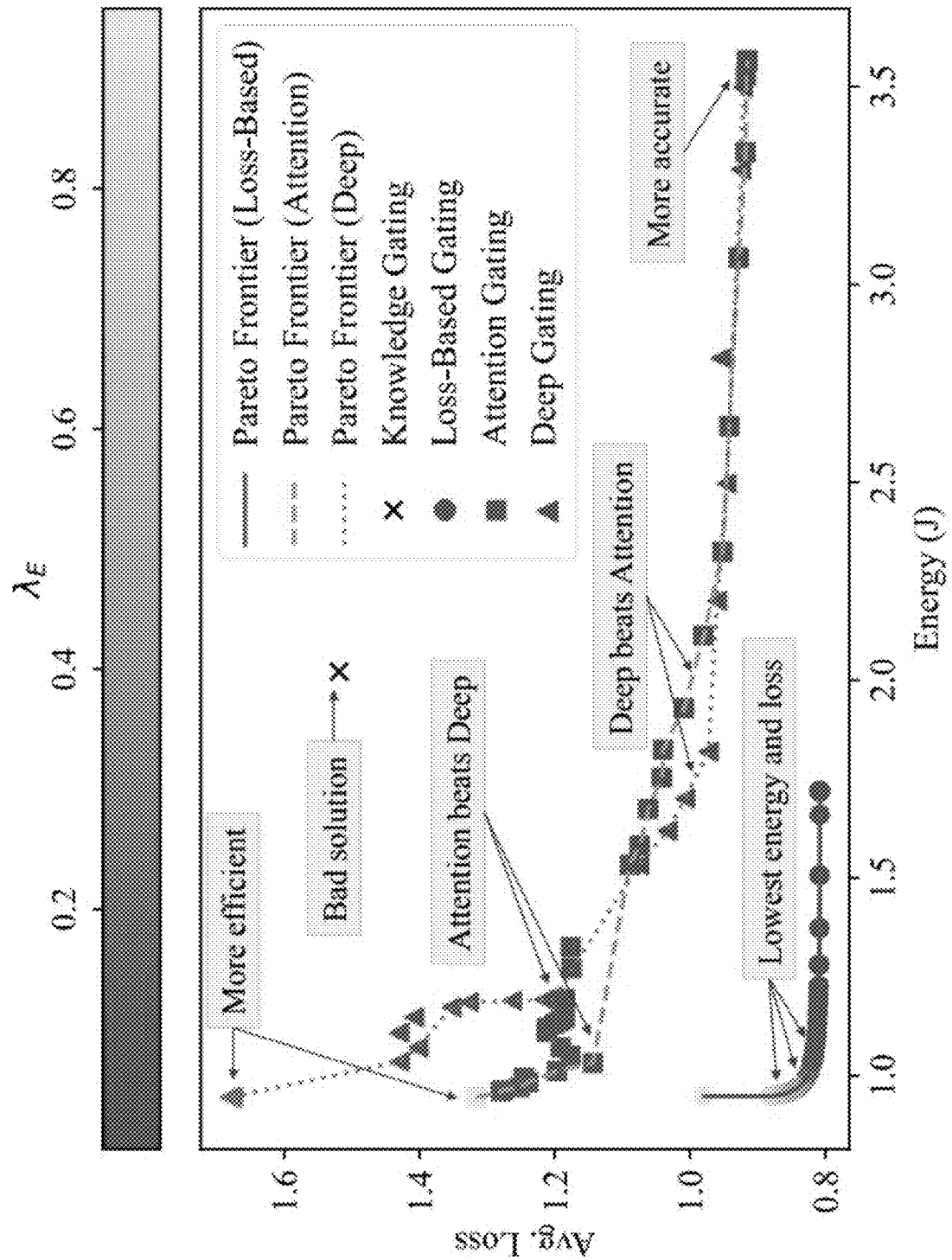
FIG. 8 shows an analysis of the energy-loss trade-off of the present invention's optimization function with gating models and AE values.

The trade-off between the performance (model loss) and energy consumption (in Joules) was evaluated for each gating model in FIG. 8. λE was varied between 0-1.0, where each point in the chart is color-coded according to its λE value. As shown, tuning λE higher or lower skewed the model towards either increasing energy efficiency or increasing performance, respectively, so λE was chosen depending on the requirements for a given application. The configuration for Loss-Based that best minimizes both objectives were λE=0.5 with a loss of 0.966 and energy consumption of 0.844 J. Attention and Deep had similar Pareto frontiers, but Attention achieved better solutions for higher λE values while Deep achieved slightly lower loss with some low λE values. The gap between Attention/Deep and Loss-Based was likely due to modeling limitations and could potentially be closed using larger or more advanced gate models. For Attention, λE=1 (most energy efficient) resulted in a loss of 1.317 and energy consumption of 0.945 J, while λE=0 (best performing) resulted in a loss of 0.9153 and energy consumption of 3.566 J. Deep and Attention reduced energy significantly with little effect on loss by tuning λE. Knowledge was statically programmed such that, for each scenario type, domain knowledge was used to manually select the best sensor combination to use. Due to these constraints, Knowledge was less efficient in some scenarios and is not tunable with this optimization.

The results for energy consumption and performance evaluation are shown in FIG. 9A. In all of the experiments, early fusion takes in both cameras and lidar as input, while late fusion uses both cameras, lidar, and radar. The energy consumption and latency increased as the fusion method varied from none to early to late, which was as expected as the latter methods required increasingly larger detection pipelines. The single-sensors were the most efficient, but their mAP scores varied widely from 67% to 79%, likely due to inconsistent performance across scenarios. Early fusion was faster, more efficient, and achieved a higher mAP score than late fusion; however, early fusion was insufficiently robust in poor driving conditions. The present invention with λE=0.01 achieved higher mAP than all other methods with less energy than late fusion. With λE=0.05, the present invention still outperformed early fusion with less energy usage. An AV must be able to process inputs at least once every 100 ms (10 frames per second) to ensure safety. In addition to meeting this latency requirement, the present invention also executed faster than both early and late fusion, which improved safety and responsiveness by enabling the AV to process inputs more frequently. With λE=0.01, the present invention achieved an mAP score of 5.1% and 9.5% higher than early and late fusion, respectively, with 60% less energy and 58% lower latency than late fusion.

FIG. 10 shows mAP, loss, and energy results from evaluating the gating strategies at different λE values. With λE=0, the models tended to pick better-performing branches regardless of their energy consumption. As λE increased, the joint optimization significantly reduced energy consumption while keeping loss within γ of the lowest-loss configuration. Although Knowledge achieved decent mAP scores, it lacked tunability and thus achieved the same loss and energy consumption for all λE; the encoded knowledge had to be manually updated to adjust the trade-off. Loss-Based achieved the lowest loss and energy consumption but a lower mAP than Deep and Attention. This result was likely because loss was not perfectly correlated with the mAP score; mAP primarily scores object classification over properly aligned bounding boxes, while loss is measured across both classification and box regression. Overall, Attention performed slightly better than Deep and offered the best trade-off of performance and energy.

FIG. 11 shows loss and energy results for different driving scenarios in the dataset. No fusion (radar-only), early fusion, late fusion, and the present invention were evaluated with Attention Gating. As shown in the figure, the present invention performed similarly to late fusion in terms of loss across all scenarios. It is also clear that early fusion performed poorly in the difficult driving conditions present in the Fog and Snow scenarios. Late fusion was more robust and achieved relatively good performance across scenes; however, late fusion also consumed significantly more energy than all other methods. In contrast, the present invention's energy efficiency was on-par with early fusion and was significantly lower than that of late fusion. No fusion was the most energy-efficient but also had the highest overall loss.

The following is another non-limiting example of the present invention. It is to be understood that said example is not intended to limit the present invention in any way. Equivalents or substitutes are within the scope of the present invention.

The present invention was validated on the publicly available WESAD™ dataset (Philip Schmidt, Attila Reiss, Robert Duerichen, Claus Marberger and Kristof Van Laerhoven. 2018. Introducing WESAD™, a multimodal dataset for Wearable Stress and Affect Detection. In 2018 International Conference on Multimodal Interaction (ICMI â€™ 18), Oct. 16-20, 2018, Boulder, CO, USA. ACM, New York, NY, USA, 9 pages). The dataset contained data for a total of 15 subjects from both chests (RespiBAN™) and wrist (Empatica™ E4) worn sensors. The present invention focused on stress detection using only wrist-based data, as the following sensors from the Empatica™ E4 were used: ACC, BVP, EDA, and TEMP. The dataset had three types of classes related to emotional states, namely—baseline (neutral), amusement, and stress. For the 2-class problem, baseline and amusement were considered the non-stress class.

The ACC data was passed through a Finite Impulse Response (FIR) filter with a length of 64 with a cut-off frequency of 0.4 Hz. The raw BVP signal was filtered by a Butterworth band-pass filter of order 3 with cutoff frequencies ($f_1$=0.7 Hz and $f_2$=3.7 Hz) which took into account the heart rate at rest ($\approx$40 BPM) or high heart rate due to exercise scenarios or tachycardia ($\approx$220 BPM). The raw EDA signals were filtered using a Butterworth lowpass filter of order 6 with a cut-off frequency of 1 Hz. Finally, the raw TEMP signals were smoothed by passing them through a Savitzky-Golay filter (window size=11, order=3). The filtered signals were segmented by a window of 60 seconds of data with a sliding length of 5 seconds. It gave a total of 6458 segments for each signal across all subjects of the WESAD dataset.

The wrist sensor features were extracted including mean/standard deviations, correlations, slope, and dynamic ranges, peak and power frequencies, and absolute integrals. It is noted that this feature extraction was only performed across the sensors that were selected to run by the gate for a given input sample.

To train the individual branch classifiers within the present invention different combinations of input sensor data were used. For analysis, five different early fusion combinations of wrist sensors were used as input branches—$B_1$={BVP, EDA, TEMP}; $B_2$={ACC, BVP, EDA}; $B_3$={BVP, EDA}; $B_4$={ACC, BVP}; $B_5$={ACC, EDA}. Each branch was evaluated on five different machine learning classifiers—Decision Tree (DT), Random Forest (RF), AdaBoost (AB), Linear Discriminant Analysis (LDA), K-Nearest Neighbor (KNN). The classifiers were chosen to ensure a fair comparison with the original WESAD work. Additionally, the low complexity of the classifiers made the present invention suitable for wearable devices. The same configurations were used for the classifiers. DT was used as the base estimator for the RF and AB ensemble classifiers where 100 base estimators were used for both RF and AB. Information gain was used to measure the splitting quality of the decision nodes with the minimum number of samples to split a node set to 20. For KNN, the K value was set to 9. Leave-one-subject-out (LOSO) validation was used to train all the classifiers.

Out of the 25 (5 branches×5 classifiers per branch) possible branch classifiers, the branches with the minimum training loss were selected to be used within the experiment. The training loss was calculated from the classification confidence of the trained classifiers on the training samples using the categorical cross entropy, $CE=-\Sigma_i^{n_c} y_i \log \hat{y}_i$, where y is the one hot encoded true label of a sample and $\hat{y}$ is the corresponding classification output for that sample, $n_c$ is the number of classes. Thus, CE was calculated for all the training samples across all rounds of LOSO validation. RF classifiers for input branches $B_1$, $B_2$, and $B_3$ were selected as the branch classifiers for the present invention as they showed minimum training loss, justified by their performance. These three branches also utilized all four sensing modalities across the three different early fusion combinations.

The gating model's objective was to select the subset of branch classifiers that have the minimum loss given the particular training sample. Therefore, for each of the training samples, gating labels were generated representing the branch that has the minimum training loss. These gating labels were used as the labels to train the gating model. Note that, for each round of LOSO validation, only the training data was used to generate gating labels and no test data was used to ensure the validity of the approach.

The gating model interpreted the context of a sample by modeling the movement that occurred during that segment. Therefore, the ACC features were used as input data to train the gating model with the labels generated from the previous section. A DT classifier was used as the gating model where the minimum number of samples to split a node is set to 20. The DT classifier was very lightweight and helps to minimize the overhead of the present invention, making it suitable for wearable devices. Once the gating model was trained, the test subject data was used to test the architecture as shown in FIG. 12. The gating model output the probability of using the three final branch classifiers based on the test subject's ACC features. It is to note that, one, two, or all of the final classifiers were selected for final classification depending on the value of δ. For the 3-class (2-class) classification problem δ=0.4 (δ=0.1). The additional features were extracted based on the required input of the selected branch classifiers, and a late fusion method was applied on the classification output of the selected branches to generate the final output.

The Kalman filter-based method was the only late fusion method in the implementation that required tuning. Kalman filters require an initial state ($x_0$), state covariance ($P_0$), and process noise and measurement noise vectors, v and w, respectively. For the 3-class (2-class) problem, $x_0=[0.8, 0.1, 0.1]^T$ ($x_0=[0.8, 0.2]^T$) and $P_0=0.01 \cdot I_{3\times 3}$ ($P_0=0.01 \cdot I_{2\times 2}$). The state transition matrix F and measurement matrix H were identity matrices for the respective problems. The Q for both problems was modeled as a discrete-time white process noise with variance set at 5e-4. The measurement noise was modeled as a function of each measurement to allow the filter to adjust the confidence of the measurements according to each reported class probability: $R=((1-z) \cdot 2 \cdot I_{3\times 3})^2$ ($R=((1-z)/2 \cdot I_{2\times 2})^2$). Lastly, a tunable threshold technique was used to process the measurements which involved (i) an ϵ parameter to select measurements that had a maximum predicted probability above the threshold and (ii) a γ factor to scale the measurements to account for the imbalanced class distribution in the dataset. This thresholding process allowed for the filter to weight each measurement it received with a differing degree of noise while also attempting to resolve issues that arose from imbalanced datasets. For the 3-class (2-class) problem, ϵ=0.4 (ϵ=0.7) and $\gamma=[0.278, 1, 1]^T$ ($\gamma=[0.667, 1.1]^T$). During 3-class classification, the prediction probabilities were generally lower as they were distributed across an additional class when compared to 2-class classification, thus calling for a lower ϵ threshold.

As stated previously, the WESAD dataset was highly imbalanced in terms of the number of segments per class. For this reason, $F_1$ score was also used along with accuracy to measure the classification performance. To ensure a fair comparison with other works, the macro $F_1$ score was used. The metrics used for evaluation are given below:

$$\text{Accuracy} = (TP + TN)/(TP + FP + TN + FN) \quad (21)$$

$$P = TP/(TP + FP), R = TP/(TP + FN) \quad (22)$$

$$\text{Macro } F_1 = \frac{1}{n_c} \sum_i^{n_c} 2 * \frac{P_i \cdot R_i}{P_i + R_i} \quad (23)$$

where TP, TN, FP, FN represents True Positives, True Negatives, False Positives, and False Negatives, respectively; and P and R represent Precision and Recall, respectively. The classes are indexed by i, and $n_c$ is the number of output classes.

This section presents the performance of the present invention for stress detection in 3-class and 2-class classification. It was also demonstrated that the energy efficiency of the approach in an ultra-low-power 32-bit microcontroller EFM32 Giant Gecko™ (EFM32GG-STK3700A) representing a wearable device. The microcontroller had an ARM™ Cortex-M3 processor with a maximum clock rate of 48 MHz. It has 128 KB of RAM and 1 MB of flash memory.

FIGS. 13A-13B show the performance analysis of different classifiers for various input branches for the 3-class and 2-class problems, with each branch representing different combinations of input sensors. The RF classifier for branches $B_1$, $B_2$, and $B_3$ showed better or competitive performance compared to the other classifiers for both 3-class and 2-class. The RF classifiers also achieved minimum training loss for these input branches during training, leading to the selection of these three branches with the RF classifier for the approach.

FIG. 13C shows the overall performance comparison of the related works against the proposed method. For the three selected branch classifiers, the soft- and hard-voting methods are applied, showing performance improvements compared to the individual branch classifiers for both 3-class and 2-class classification. Lastly, the present invention using Kalman filter-based late fusion further improved the performance for 3-class and 2-class classification compared to these traditional late fusion methods. Despite using only wrist signals, the present invention outperformed all other state-of-the-art works that use either wrist, chest, or both sensors for 3-class and 2-class classification.

As shown in FIG. 13C, traditional late fusion improved the performance compared to individual branch classifiers. However, it was not energy-efficient, as multiple classifiers needed to be used simultaneously—unlike the present invention that minimized the number of classifiers selected for a given segment. The present invention was benchmarked with hard-voting late fusion, which was relatively more energy-efficient than soft-voting and showed similar performance to soft-voting. As shown in FIG. 4 for 3-class classification, the present invention with δ=0.4 improves up to ~8% accuracy and ~8% F-1 score, while being 2.2× energy-efficient compared to hard-voting. Similarly, for 2-class classification, the present invention with δ=0.1 outperformed hard-voting by up to ~4% accuracy and ~6% F-1 score while being 2.7× energy-efficient. The higher energy efficiency for 2-class was partially attributed to the lower δ=0.1, which reduced the use of multiple branches compared to δ=0.4 for the 3-class. The higher δ for 3-class was chosen to prioritize performance over energy, as the 3-class problem was inherently more challenging than the 2-class problem.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting essentially of" or "consisting of", and as such the written description requirement for claiming one or more embodiments of the present invention using the phrase "consisting essentially of" or "consisting of" is met.

The reference numbers recited in the below claims are solely for ease of examination of this patent application, and are exemplary, and are not intended in any way to limit the scope of the claims to the particular features having the corresponding reference numbers in the drawings.

What is claimed is:

1. A multi-sensor computer system for identifying a current context and determining combination of sensors for the current context, the multi-sensor computer system comprising:
   a. a plurality of sensors (100) operatively coupled to the multi-sensor computer system such that an output of each sensor of the plurality of sensors (100) relates to a state of the multi-sensor computer system;
   b. a processor (200) capable of executing computer-readable instructions; and
   c. a memory component (300) operatively connected to the processor comprising:
      i. a plurality of convolutional neural networks (CNNs), wherein each CNN of the plurality of CNNs is configured to accept a plurality of sensor outputs from the plurality of sensors (100) as input, and generates a set of features found in the output from the sensor as output;
      ii. one or more gating models, wherein each gating model of the one or more gating models is configured to accept a plurality of sets of features as input, identify the current context, estimate a performance of one or more branches in the current context, each branch comprising an object detection model and representing a fusion of sensors and sensor fusion timing, and selecting one or more selected branches of the one or more branches;
      iii. a plurality of computer-readable instructions that, when executed by the processor, cause the processor to perform operations comprising:
         A. accepting a plurality of sensor outputs from the plurality of sensors (100);
         B. executing the plurality of CNNs, wherein each CNN corresponds to a sensor output of the plurality of sensor outputs, wherein the plurality of CNNs accept the plurality of sensor outputs as input and generate the plurality of sets of features as output;
         C. executing the one or more gating models to determine the one or more selected branches based on the plurality of sets of features;
         D. generating, based on each object detection model of the one or more selected branches, one or more detections corresponding to the one or more selected branches, each detection comprising bounding box coordinates, confidence level, and classification;
         E. executing a fusion block comprising a plurality of fusion algorithms to generate a final fusion of the one or more detections corresponding to the one or more selected branches; and
         F. determining, based on the final fusion, one or more objects relative to the multi-sensor computer system.

2. The system of claim 1, wherein the plurality of sensors (100) comprise a camera, a radar sensor, a lidar sensor, or a combination thereof.

3. The system of claim 1, wherein the current context is selected from a group comprising city, motorway, junction, rural, snow, fog, and night.

4. The system of claim 1, wherein the one or more gating models comprises a rigid knowledge-based gating model comprising steps for determining the current context based on the plurality of sets of features and data from a navigation/weather system.

5. The system of claim 1, wherein the one or more gating models comprises a learned dynamic deep gating model comprising steps for implementing a gating CNN, a multi-layer perceptron (MLP), a recurrent neural network (RNN), or any other deep learning or statistical model to compare the plurality of sets of features to possible branches in order to determine the one or more selected branches.

6. The system of claim 1, wherein the one or more gating models comprises an attention-based dynamic gating model comprising steps for selecting one or more sets of features of the plurality of sets of features comprising over 50% of sensor outputs for determining the current context, and comparing the one or more selected sets of features to possible branches in order to determine the one or more selected branches.

7. The system of claim 1, wherein selecting the one or more selected branches comprises executing a top-k algorithm.

8. The system of claim 1, wherein the plurality of fusion algorithms comprises non-maximum suppression for calculating an intersection over union of corresponding bounding box estimations and determining which bounding box estimations to keep based on confidence levels.

9. The system of claim 1, wherein the plurality of fusion algorithms comprises soft non-maximum suppression (NMS) for lowering confidence levels by a Gaussian weighting function, and determining which bounding box estimations remain above a first threshold value, weighted box fusion for clustering bounding box estimations and iterating over intersection over union values for each bounding box estimation to determine which bounding box estimations have a confidence score over a second threshold value, or a combination thereof.

10. The system of claim 1, wherein the memory component further comprises instructions for:
   a. selecting, from the one or more selected branches, one or more energy-efficient branches that minimize energy consumption and expected loss based on comparison of expected energy consumption of the one or more branches to expected loss of the one or more branches.

11. A method for identifying a current context and determining a combination of sensors for the current context in a multi-sensor computer system, the method comprising:
   a. providing a plurality of sensors (100) operatively coupled to the multi-sensor computer system such that an output of each sensor of the plurality of sensors (100) relates to a state of the multi-sensor computer system;
   b. accepting a plurality of sensor outputs from the plurality of sensors (100);
   c. executing a plurality of convolutional neural networks (CNNs), wherein each CNN corresponds to a sensor output of the plurality of sensor outputs, wherein the plurality of CNNs accept the plurality of sensor outputs as input and generates a plurality of sets of features as output;
   d. executing one or more gating models, wherein each gating model of the one or more gating models is configured to accept the plurality of sets of features as input, identify the current context, estimate a performance of one or more branches in the current context, each branch comprising an object detection model and representing a fusion of sensors and sensor fusion timing, and selecting one or more selected branches of the one or more branches, to determine the one or more selected branches;
   e. generating, based on each object detection model of the one or more branches, one or more detections corresponding to the one or more selected branches, each detection comprising bounding box coordinates, confidence level, and classification;
   f. executing a fusion block comprising a plurality of fusion algorithms to generate a final fusion of the one or more detections corresponding to the one or more selected branches; and
   g. determining, based on the final fusion, one or more objects relative to the multi-sensor computer system.

12. The method of claim 11, wherein the plurality of sensors (100) comprise a camera, a radar sensor, a lidar sensor, or a combination thereof.

13. The method of claim 11, wherein the current context is selected from a group comprising city, motorway, junction, rural, snow, fog, and night.

14. The method of claim 11, wherein the one or more gating models comprises a rigid knowledge-based gating model comprising steps for determining the current context based on the plurality of sets of features; and data from a navigation/weather system.

15. The method of claim 11, wherein the one or more gating models comprises a learned dynamic deep gating model comprising steps for implementing a gating CNN, a multi-layer perceptron (MLP), a recurrent neural network (RNN), or any other deep learning or statistical model to compare the plurality of sets of features to possible branches, an attention-based dynamic gating model comprising steps for selecting one or more sets of features of the plurality of sets of features comprising over 50% of sensor outputs for determining the current context, and comparing the one or more selected sets of features to possible branches, or a combination thereof in order to determine the one or more selected branches.

16. The method of claim 11, wherein selecting one or more branches comprises executing a top-k algorithm.

17. The method of claim 11, wherein the plurality of fusion algorithms comprises non-maximum suppression for calculating an intersection over union of corresponding bounding box estimations and determining which bounding box estimations to keep based on confidence levels.

18. The method of claim 11, wherein the plurality of fusion algorithms comprises soft-NMS for lowering confidence levels by a Gaussian weighting function, and determining which bounding box estimations remain above a threshold value.

19. The method of claim 11, wherein the plurality of fusion algorithms comprises weighted box fusion for clustering bounding box estimations and iterating over intersection over union values for each bounding box estimation to determine which bounding box estimations have a confidence score over a threshold value.

20. The method of claim 11, further comprising steps for:
   a. selecting, from the one or more selected branches, one or more energy-efficient branches that minimize energy consumption and expected loss based on comparison of expected energy consumption of the one or more branches to expected loss of the one or more branches.

* * * * *